(12) United States Patent
Ou et al.

(10) Patent No.: US 10,734,902 B2
(45) Date of Patent: Aug. 4, 2020

(54) CONTROL OF FOUR-SWITCH, SINGLE INDUCTOR, NON-INVERTING BUCK-BOOST CONVERTERS

(71) Applicant: Microchip Technology Incorporated, Chandler, AZ (US)

(72) Inventors: Jiong Ou, Baden Wuerttemberg (DE); Scott Dearborn, Brackney, PA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/564,221

(22) Filed: Sep. 9, 2019

(65) Prior Publication Data

US 2020/0091822 A1 Mar. 19, 2020

Related U.S. Application Data

(60) Provisional application No. 62/730,705, filed on Sep. 13, 2018.

(51) Int. Cl.
| | |
|---|---|
| *H02M 3/158* | (2006.01) |
| *G05F 1/45* | (2006.01) |
| *H02M 1/08* | (2006.01) |
| *H02M 1/00* | (2006.01) |

(52) U.S. Cl.
CPC ........... *H02M 3/1582* (2013.01); *H02M 1/08* (2013.01); *G05F 1/452* (2013.01); *H02M 3/1584* (2013.01); *H02M 2001/0025* (2013.01)

(58) Field of Classification Search
CPC .... G05F 1/452; H02M 3/1582; H02M 3/1584
USPC .......................................... 323/283–285, 288
See application file for complete search history.

(56) References Cited

U.S. PATENT DOCUMENTS

| | | | | |
|---|---|---|---|---|
| 6,724,174 | B1 | 4/2004 | Esteves et al. | 323/224 |
| 9,385,606 | B2 * | 7/2016 | Bazzani | H02M 3/1582 |
| 9,407,144 | B2 * | 8/2016 | Ozanoglu | H02M 3/1582 |
| 9,621,041 | B2 * | 4/2017 | Sun | H02M 3/158 |
| 2007/0052395 | A1 | 3/2007 | Belch | 323/222 |
| 2010/0019745 | A1 | 1/2010 | Keskar et al. | 323/271 |
| 2010/0085028 | A1 * | 4/2010 | Moussaoui | H02M 3/157 323/284 |

(Continued)

OTHER PUBLICATIONS

International Search Report and Written Opinion, Application No. PCT/US2019/050295, 16 pages, dated Dec. 6, 2019.

*Primary Examiner* — Gary A Nash
(74) *Attorney, Agent, or Firm* — Slayden Grubert Beard PLLC

(57) ABSTRACT

A power converter includes a buck leg circuit connected between a voltage input of the power converter and ground, a boost leg circuit connected between a voltage output of the power converter and ground, an inductor connected between the buck leg circuit and the boost leg circuit, an error amplifier configured to compare the voltage output of the power converter against a reference voltage to yield a feedback signal, and a control circuit. The control circuit is configured to generate a reference buck ramp configured to be compared against the feedback signal to determine whether to operate the buck leg circuit in buck mode, and to generate a reference boost ramp by superposing a variable boost ramp portion on to the reference buck ramp, the reference boost ramp configured to be compared against the feedback signal to determine whether to operate the boost leg circuit in boost mode.

18 Claims, 17 Drawing Sheets

(56) References Cited

U.S. PATENT DOCUMENTS

| | | | |
|---|---|---|---|
| 2011/0241636 A1* | 10/2011 | Wu | H02M 3/1584 |
| | | | 323/272 |
| 2012/0153915 A1* | 6/2012 | Loikkanen | G05F 1/618 |
| | | | 323/283 |
| 2015/0054478 A1* | 2/2015 | Prexl | H02M 3/1582 |
| | | | 323/271 |
| 2016/0359414 A1* | 12/2016 | Ozanoglu | H02M 3/1582 |
| 2017/0155324 A1* | 6/2017 | Choquet | H02M 3/158 |
| 2017/0201178 A1* | 7/2017 | Cheng | H02M 3/1582 |

\* cited by examiner

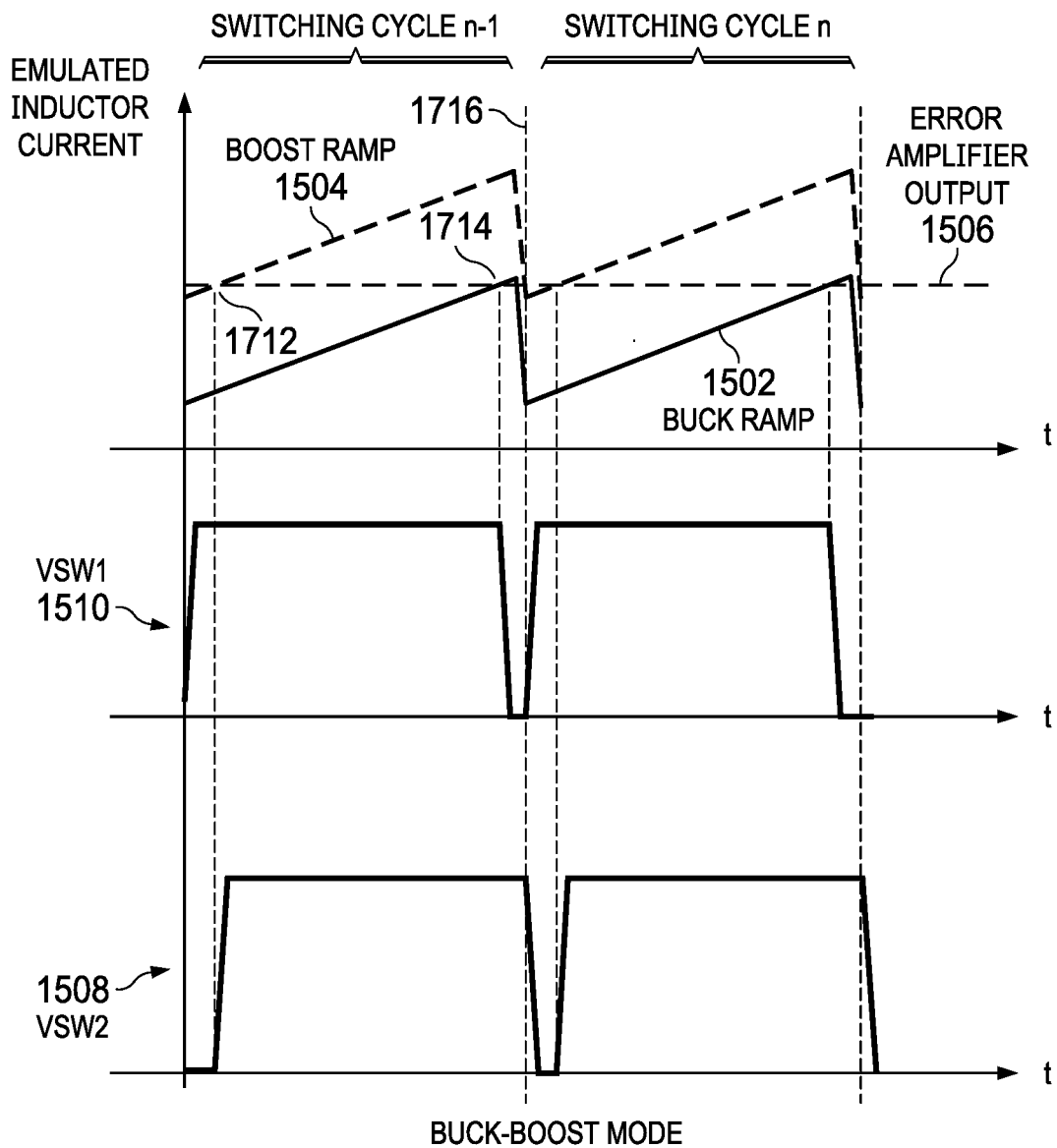

CONTROL OF FOUR-SWITCH, SINGLE INDUCTOR, NON-INVERTING BUCK-BOOST CONVERTERS

RELATED APPLICATIONS

The present application claims priority to U.S. Provisional Application No. 62/730,705 filed Sep. 13, 2018, the contents of which are hereby incorporated in their entirety.

TECHNICAL FIELD

The present disclosure relates to methods and systems for power conversion and, more particularly, to control of four-switch, single inductor, non-inverting buck-boost converters.

BACKGROUND

Buck-boost converters may convert an input direct current (DC) voltage to a higher or lower output DC voltage. Buck-boost converters may operate with a buck or step-down functionality wherein buck legs or subcircuits are in operation. Buck-boost converters may operate with a boost or step-up functionality, wherein boost legs or subcircuits are in operation. Furthermore, buck-boost converters may operate with a buck-boost functionality, wherein buck legs and boost legs are both in operation at the same time, and the converter may convert DC voltage to a higher or a lower voltage. Buck-boost converters may be made with an inverting topology or a non-inverting topology. In an inverting topology, a buck-boost converter may produce output voltage that has an opposite polarity as the input voltage to the buck-boost converter. In a non-inverting topology, a buck-boost converter may produce output voltage that has a same polarity as the input voltage to the buck-boost converter.

In order to accomplish a buck-boost converter that may operate with buck, boost, and buck-boost functionality, the buck-boost converter may be implemented in a four-switch topology. The four-switch topology may enable operation of the converter alternately in buck, boost, and buck-boost mode.

The transition between buck, boost, and buck-boost functionality may be triggered or handled by a forced mode transition approach. This approach utilizes comparators for monitoring the input voltage and partitioning the input voltage range into zones from lowest to highest input voltage, one each for boost, buck-boost, and buck operation. As input voltage reaches a different range, different parts of the circuit may be switched on and off. This approach may have bad output performance during transitions between boost, buck-boost, and buck operation. Voltage drop and overshoot occur as the converter transitions from one operation to another.

The transition between buck, boost, and buck-boost functionality may be triggered or handled by an automatic mode transition using voltage mode control. This approach utilizes an offset voltage added to a ramp voltage to generate two separate predefined voltage ramps. The separated ramp voltages are in turn compared with the output of an error amplifier. The error amplifier compares the output of the converter with a defined, target value. The output of the error amplifier may generate pulse width modulation (PWM) signals. However, this approach is limited to voltage mode-controlled converters. This causes drawbacks such as a slow response to changes in the load. Furthermore, such a converter with continuous conduction would be difficult to construct with regards to compensation of the converter under all operation conditions, as the output capacitor and inductor already form a second order system.

Another approach may include automatic mode transition with peak current mode control, which uses two current ramps and compares these ramps with an output of a voltage-loop compensator to generate PWM signals. One of the current ramps is generated by sensing an inductor current and the other current ramp is generated by adding a pedestal to the first current ramp. This approach has drawbacks. It is very difficult to define an appropriate pedestal voltage to achieve a perfect matching between the two current ramps with a minimum of overlap and no gaps between the ramps. To maintain correct regulation, there should preferably be no gap between buck and boost operation regions. To ensure this, both regions may overlap somewhat to account for possible component tolerances. However, overlap causes an efficiency penalty due to increased switching losses in the buck-boost region, as all four switches are switched during one cycle. Therefore, the overlap or buck-boost region should preferably not be larger than needed. Due to the non-ideality of components, such as capacitors and inductors, there are times when the current ramps overlap but there are also times when the current ramps separate. The larger the overlap, the more that the converter will work in buck-boost operation, reducing efficiency. The larger the separation, the more the converter will operate in a mode in which regulation is not working correctly, wherein the output of the converter is not regulated but defined by the load of the converter.

Yet another approach may include automatic mode transition with average current mode control. This approach uses two artificial current ramps which are compared in turn to the output of an average current-loop compensator to generate PWM signals. Like in automatic mode transition with peak current mode control, one ramp is superimposed over another ramp. However, this approach may require a complicated compensation network. When targeting large ranges for input, output, and load, stable operation of the converter under all conditions is very difficult.

The disadvantages of various converters described above have been recognized and identified by inventors of embodiments of the present disclosure. Embodiments of the present disclosure may provide converters with automatic mode transition that solve at least some of such identified problems, such as bad performance between boost, buck-boost, and buck operation, slow response to changes in a load of the converter, difficult implementation of compensation under various operating conditions, misalignment of current ramps, a complicated compensation network, and stable operation over large ranges of input, output, and load values.

Inventors of embodiments of the present disclosure have recognized that four-switch, single inductor buck-boost converters are challenging to control. Embodiments of the present disclosure include methods and circuits for controlling a four-switch, single inductor buck-boost converter with automatic, smooth, and better mode transition without sacrificing converter performance regarding efficiency, bandwidth, input-output range etc. Bad mode transition and bad control method degrades converter performance and limits applications of the topology. Embodiments of the present disclosure may include improvements over existing control techniques, such as better mode transition performance, better regulation loop in the various operation modes, higher noise immunity, both smooth and automatic mode transitions, higher efficiency at light load, and may be suitable for power conversion applications having large input and output voltage swing and need both buck and boost functions.

SUMMARY

Embodiments of the present disclosure may include a power converter. The power converter may include a buck leg circuit, a boost leg circuit, and an inductor connected between the buck leg circuit and the boost leg circuit. The buck leg circuit and the boost leg circuit may each include two switches or transistors. The transistors may be of any suitable make or type, such as NMOS transistors. The switches or transistors may be connected in series. The buck leg circuit and the boost leg circuit may each include drivers, logic, and charge pumps. The buck leg circuit may be connected between a voltage input of the power converter and ground. The boost leg circuit may be connected between a voltage output of the power converter and ground. The boost leg circuit and the buck leg circuit may be connected through an inductor. The boost leg circuit and the buck leg circuit may be connected through the inductor at a midpoint of each of the leg circuits. The midpoint at each of the leg circuits may be at a junction between the respective switches or transistors of the leg circuits. The converter may include an error amplifier configured to compare the voltage output of the power converter against a reference voltage to yield a feedback signal. The converter may include a control circuit. The control circuit may include the error amplifier. The error amplifier may be located outside the control circuit. The control circuit may be configured to generate a reference buck ramp. The reference buck ramp may be configured to be compared against the feedback signal to determine whether to operate the buck leg circuit in buck mode. The control circuit may be configured to generate a reference boost ramp by superposing a variable boost ramp portion on to the reference buck ramp. The reference boost ramp may be configured to be compared against the feedback signal to determine whether to operate the boost leg circuit in boost mode.

In combination with any of the above embodiments, the converter may further include a burst mode circuit. The burst mode circuit may be configured to send a signal to the control circuit to operate the buck leg circuit or the boost leg circuit in a burst mode based upon a determination that a load connected to the power converter has crossed below a threshold value. In combination with any of the above embodiments, the burst mode circuit may be configured to determine that the load connected to the power converter has crossed below a threshold value by comparing the feedback signal against a reference voltage.

In combination with any of the above embodiments, the converter may further include a clamping circuit configured to modify the feedback signal to at least a minimum value based upon whether the burst mode is to be used. In combination with any of the above embodiments, the modified feedback signal may be applied to the buck ramp and the boost ramp to yield a clamped buck ramp and a clamped boost ramp. In combination with any of the above embodiments, the control circuit may be configured to issue control signals to the buck and boost leg circuits based upon the clamped buck and boost ramps.

In combination with any of the above embodiments, the clamping circuit is further configured to modify the feedback signal based upon voltage input and voltage output of the power converter.

In combination with any of the above embodiments, the clamping circuit may include circuitry to model a curve of the modified feedback signal as a function of voltage input to generate the modified feedback signal. In combination with any of the above embodiments, the clamping circuit may include circuitry to generate a boost clamp signal based upon a difference between input and output voltage, times a constant. The boost clamp signal may be based further on a sampled peak of a capacitor charged using a current source based upon input voltage. The boost clamp signal may be based further on an offset of another constant. In combination with any of the above embodiments, the clamping circuit may include circuitry to generate a buck clamp signal based upon a relationship between input and output voltage. The buck clamp signal may be an offset, plus a constant times voltage input, plus another constant times voltage output, if input voltage is sufficiently greater than output voltage as defined by a given threshold. The buck clamp signal may be an offset, plus a constant times voltage output, if input voltage is not sufficiently greater than output voltage as defined by a given threshold. One or both of the buck and boost clamp signals may be selected as output of the clamping circuit based upon the relationship of input and output voltages, and whether the converter is to run in buck, boost, or buck-boost mode.

In combination with any of the above embodiments, the converter may further include a current sensor configured to sense current flowing in the power converter. The control circuit may be further configured to generate the reference buck ramp based upon the current sensed by the current sensor. Furthermore, the control circuit may be further configured to generate the reference buck ramp based upon the current sensed by the current sensor.

In combination with any of the above embodiments, the current sensor may be configured to sense current in the boost leg circuit.

In combination with any of the above embodiments, the reference boost ramp may be superposed to the reference buck ramp by a current ramp generator circuit. The current ramp generator circuit may be configured to generate the reference buck ramp by sampling a capacitor configured to store current generated by a current source dependent upon input voltage. The current ramp generator circuit may be further configured to generate the reference buck ramp by adding the sensed current to the sampled capacitor storing current generated by the current source dependent upon input voltage. The current ramp generator circuit may be configured to generate the reference boost ramp by sampling another capacitor configured to store current generated by another current source dependent upon output voltage. The current ramp generator circuit may be further configured to generate the reference boost ramp by superposing the sampled capacitor value storing current generated by another current source dependent upon output voltage to the reference buck ramp.

Embodiments of the present disclosure may include a system. The system may include a voltage source, a load, and any of the converters of the above embodiments. The converter may receive the voltage source and provide a voltage output to the load. The system may include a power supply, microcontroller, computer, laptop, smart phone, or any other suitable electronic device or system. The load may include any subsystem, peripheral, or other component internal or external to the microcontroller, power supply, or laptop. The system may include a power supply.

Embodiments of the present disclosure may include a method, performed by the operation of any of the systems or converters of the above embodiments.

BRIEF DESCRIPTION OF THE DRAWINGS

FIG. 17 illustrates buck-boost operation of a converter, according to embodiments of the present disclosure.

DETAILED DESCRIPTION

Figure 1:
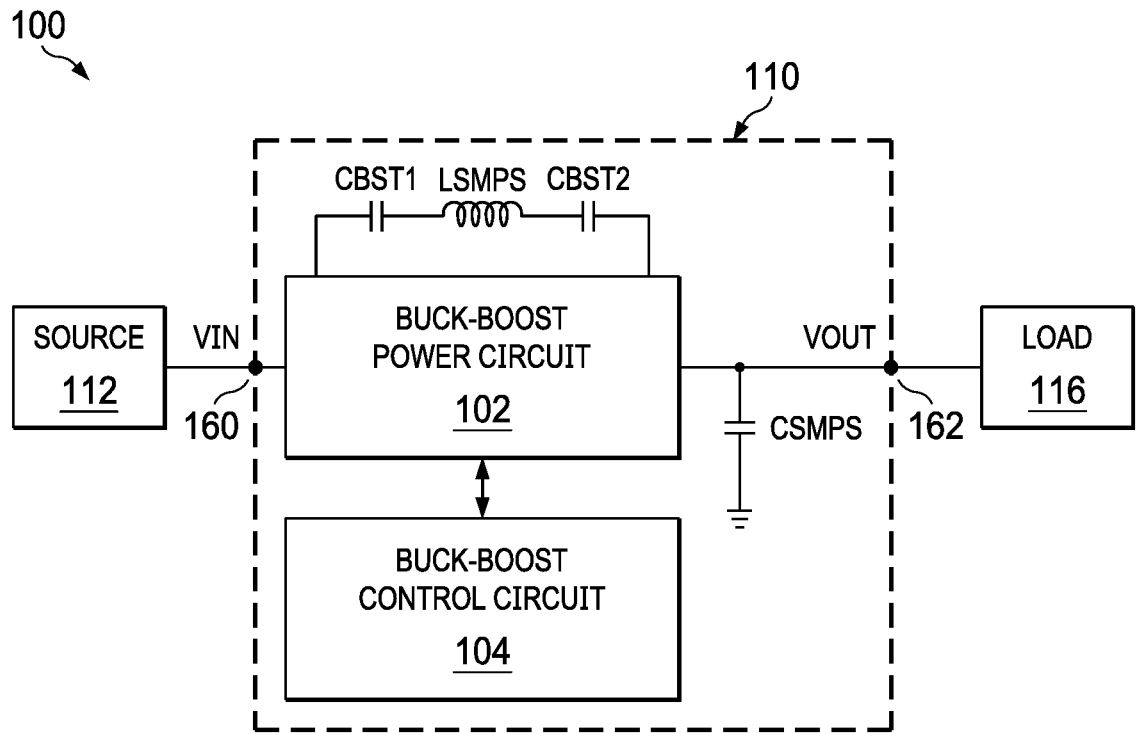
FIG. 1 is an illustration of a system providing conversion of power using conditional offsets, according to embodiments of the present disclosure.

FIG. 1 is an illustration of a system 100 providing conversion of power using conditional offsets, according to embodiments of the present disclosure. System 100 may be, for example a power supply, microcontroller, computer, laptop, smart phone, or any other suitable electronic device or system.

System 100 may include a voltage source 112. Voltage source 112 may be a DC voltage source. Voltage source 112 may be implemented in any suitable manner and provide any suitable voltage. System 100 may be configured to provide a regulated voltage level to a load 116. Load 116 may be any suitable consumer of voltage, such as a circuit or other electronic device or component. In order to provide the regulated voltage level to load 116, system 100 may include a voltage regulator or converter 110. The output of voltage source 112 may be designated as VIN (voltage input) as applied at an input port 160 of voltage regulator 110. The voltage provided to load 116 may be designated as VOUT (voltage output) as applied through an output port 162 of voltage regulator 110 connected to load 116.

Converter 110 may be configured to maintain a fixed DC voltage output as VOUT. Fixed DC voltage output may be maintained across various values of voltage inputs of VIN at input port 160 and across various loads attached to the output of converter 110 at output port 162. Converter 110 may be implemented by, for example, a buck-boost converter. In particular, converter 110 may be implemented as a four-switch, single inductor, buck-boost converter. VOUT may be an output with the same or a different polarity as was provided by VIN. Converter 110 may use two of the switches to implement a buck converter leg. The buck converter leg may be configured to lower VIN so as to meet a target voltage for VOUT. Converter 110 may use the other two switches to implement a boost converter leg. The boost converter leg may be configured to raise VIN so as to meet a higher target voltage for VOUT. If converter 110 is utilizing only the buck converter leg, converter 110 may be said to be operating in buck mode. If converter 110 is utilizing only the boost converter leg, converter 110 may be said to be operating in boost mode. If converter 110 is utilizing both the booster converter leg and the buck converter leg, converter 110 may be said to be operating in buck-boost mode. Converter 110 may include a single inductor LSMPS. Furthermore, converter 110 may include capacitors CBST1 and CBST2 connected to the ends of LSMPS. Converter 110 may be configured to operate as a switched mode power supply (SMPS).

In one embodiment, converter 110 may be configured to generate an artificial buck current ramp for buck operation and generate an artificial boost current ramp for boost operation based on VIN and VOUT. In a further embodiment, the boost current ramp may be superposed to the buck current ramp by sampling the peak of the buck current ramp and using it as a pedestal to generate the boost current ramp each cycle. In another, further embodiment, a voltage clamping circuit may be used to allow converter 110 to use burst mode operation at a light load on VOUT.

Converter 110 may include a buck-boost power circuit 102. Buck-boost power circuit 102 may implement the buck converter leg and the boost converter leg. Converter 110 may include a buck-boost control circuit 104. Buck-boost control circuit 104 may be configured to control operation of buck-boost power circuit 102. Buck-boost control circuit 104 may be configured to control operation of buck-boost power circuit 102 by, for example, issuing pulsed width modulation (PWM) signals. The PWM signals may be applied to gates of the switches of the buck converter and the boost converter. Depending upon the frequency of the PWM signals, and whether the PWM signals are applied to switches of the buck converter leg, the boost converter leg, or both the buck converter leg and the boost converter leg, buck-boost power circuit 102 may operate in boost mode, buck mode, or buck-boost mode. Buck-boost control circuit 104 may be configured to receive input data from buck-boost power circuit 102. Buck-boost control circuit 104 may be configured to use such input data to generate the PWM signals and send such PWM signals to buck-boost power circuit 102. The combination of CBST1, CBST2, and LSMPS may be connected between the buck converter leg and boost converter leg of buck-boost power circuit 102. An output capacitor, CSMPS, may be connected between VOUT and ground in parallel with a load connected to converter 110. CSMPS may be implemented within or outside of converter 110. LSMPS may have any suitable value, such as 5.6 uH. As converter 110 has an integrated compensation network, the inductor value may be selected so as to improve or optimize performance. CBST1, CBST2, and CSMPS may have any suitable value, such as 22 nF, 22 nF, and 22 uF, respectively. Again, as converter 110 has an integrated compensation network, the capacitor values may be selected so as to improve or optimize performance.

Buck-boost control circuit 104 may be configured to transition operation of buck-boost power circuit 102 between buck, boost, and buck-boost operation. Buck-boost control circuit 104 may be configured to enable smooth and automatic mode transition between buck, boost, and buck-boost operation. The transition between the modes may be smooth as there is little increase in error between VOUT and the target output voltage as buck-boost power circuit 102 transitions between buck, boost, and buck-boost operation. The transition between the modes may be automatic in that as soon as VIN enters various ranges, buck-boost power circuit 102 may transition between buck, boost, and buck-boost operation.

In one embodiment, buck-boost control circuit 104 may be configured to generate a buck current ramp, with which PWM signals will be generated, based on a comparison with current through inductor LSMPS, for the buck converter leg of buck-boost power circuit 102. In another embodiment, buck-boost control circuit 104 may be configured to generate a boost current ramp, with which PWM signals will be generated, based on a comparison with current through inductor LSMPS, for the boost converter leg of buck-boost power circuit 102. In yet another embodiment, the boost current ramp may be added to or superposed to the buck current ramp. The boost current ramp may be superposed to the buck current ramp by sampling a peak of current in buck-boost power circuit 104, or by determining an average thereof. The current that is sampled or average may be the current through the boost converter leg or the buck converter leg. In another embodiment, buck-boost control circuit 104 may be configured to perform a burst mode when a load connected to converter 110 is low.

Figure 2:
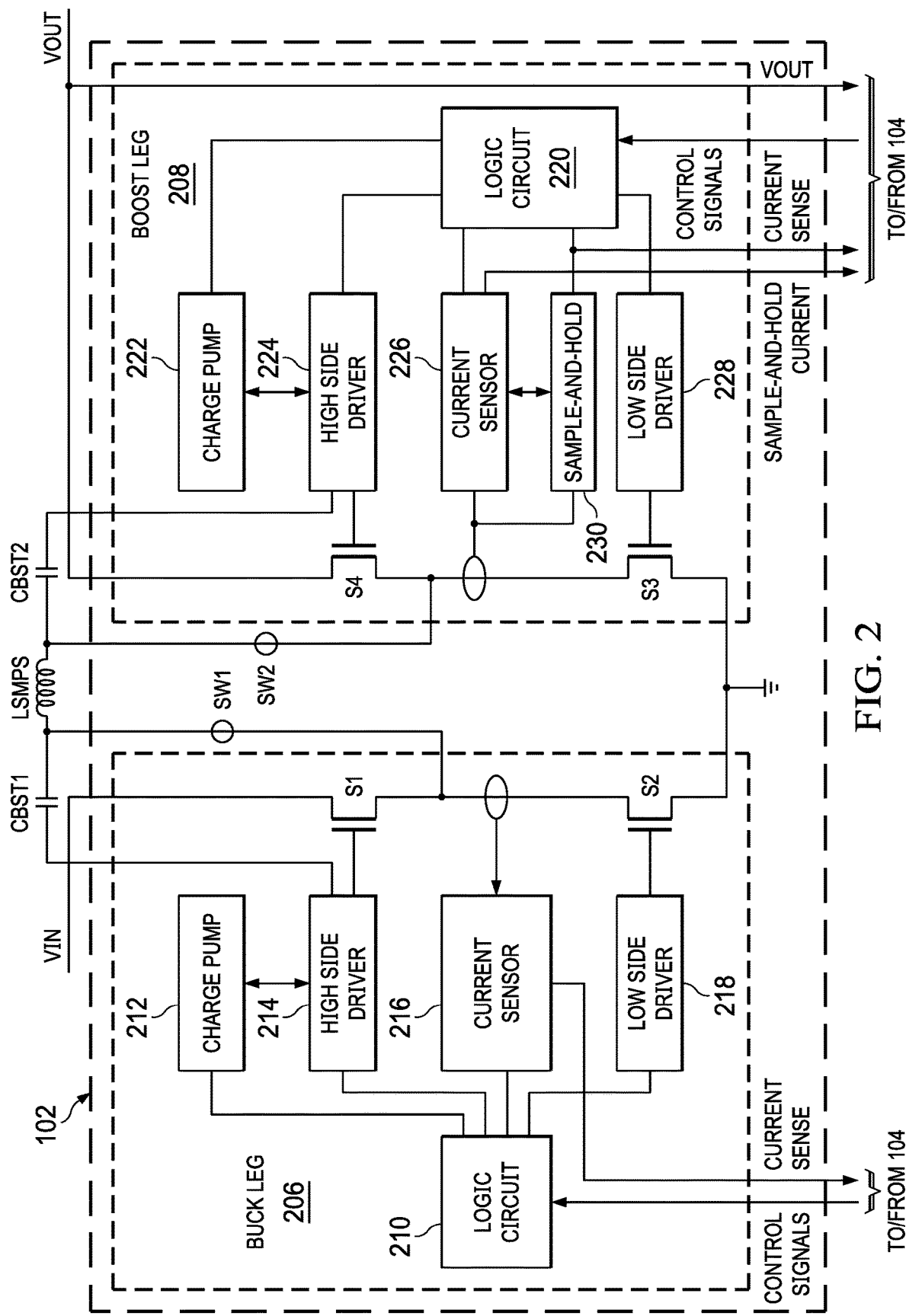
FIG. 2 is a more detailed illustration of portions of a converter, including a buck-boost power circuit, according to embodiments of the present disclosure.

FIG. 2 is a more detailed illustration of portions of converter 110, including buck-boost power circuit 102, according to embodiments of the present disclosure.

Buck-boost power circuit 102 may include a buck leg circuit 206 and a boost leg circuit 208. Buck leg circuit 206 and boost leg circuit 208 may receive control signals, such as PWM signals, from buck-boost control circuit 104. Buck leg circuit 206 and boost leg circuit 208 may provide information, such as current sense, sample and hold current, VOUT, or VIN, to buck-boost control circuit 104.

Buck leg circuit 206 may include a high-side switch S1 and a low-side switch S2. Switches S1, S2 may be implemented by any suitable circuitry, such as by a transistor. Switch S1 may be connected at its source to VIN. Switch S1 may be connected at its drain to the source of switch S2. The drain of switch S1 may also be connected between CBST1 and LSMPS. The drain of switch S1 may also be connected to a current sensor 216. Current sensor 216 may be implemented by any suitable combination of digital and analog circuitry. The drain of switch S2 may be connected to ground.

Boost leg circuit 208 may include a high-side switch S4 and a low-side switch S3. Switches S3, S4 may be implemented by any suitable circuitry, such as by a transistor. Switch S4 may be connected at its source to VOUT. Switch S4 may be connected at its drain to the source of switch S3. The drain of switch S4 may also be connected between CBST2 and LSMPS. The drain of switch S4 may also be connected to a current sensor 226. Current sensor 226 may be implemented by any suitable combination of digital and analog circuitry. In another embodiment, boost leg circuit 208 may include a sample and hold circuit 230 configured to directly sample current from the drain of switch S4 or from current sensor 226. Sample and hold circuit 230 may provide an average current value, rather than an instantaneous current value. The drain of switch S3 may be connected to ground.

Buck leg circuit 206 may include a logic circuit 210. Logic circuit 210 may be implemented by analog circuitry, digital circuitry, or any suitable combination thereof. Logic circuit 210 may be configured to receive control signals from buck-boost control circuit 104. Furthermore, logic circuit 210 may be configured to use such control signals to drive a high side driver circuit 214 and a low side driver circuit 218. High side driver circuit 214 and low side driver circuit 218 may be implemented by analog circuitry, digital circuitry, or any suitable combination thereof. High side driver circuit 214 and low side driver circuit 218 may be configured to condition control signals to switches S1 and S2. Output of high side driver circuit 214 may be connected to the gate of switch S1. Output of low side driver circuit 218 may be connected to the gate of switch S2. Output of high side driver circuit 214 may be the inverse, or nearly the inverse, of output of low side driver circuit 218. Logic circuit 210 may be configured to drive a charge pump 212. Output of charge pump 212 may be provided to CBST1. Charge pump 212 may be implemented by analog circuitry, digital circuitry, or any suitable combination thereof. Logic circuit 210 may be configured to route control signals to high side driver circuit 214 and low side driver circuit 218, which in turn may provide the control signals to the gates of switches S1 and S2. Logic circuit 210 may account for various system conditions that may otherwise pause, stop, or delay control signals from buck-boost control circuit 104. Such system conditions may include, for example, whether switching regulation is to be performed at all, whether burst mode has been entered, or other conditions.

Boost leg circuit 208 may include a logic circuit 220. Logic circuit 220 may be implemented by analog circuitry, digital circuitry, or any suitable combination thereof. Logic circuit 220 may be configured to receive control signals from buck-boost control circuit 104. Furthermore, logic circuit 220 may be configured to use such control signals to drive a high side driver circuit 224 and a low side driver circuit 228. High side driver circuit 224 and low side driver circuit 228 may be implemented by analog circuitry, digital circuitry, or any suitable combination thereof. High side driver circuit 224 and low side driver circuit 228 may be configured to condition control signals to switches S4 and S3. Output of high side driver circuit 224 may be connected to the gate of switch S4. Output of low side driver circuit 224 may be connected to the gate of switch S3. Output of high side driver circuit 224 may be the inverse, or nearly the inverse, of output of low side driver circuit 228. Logic circuit 220 may be configured to drive a charge pump 222. Output of charge pump 212 may be provided to CBST2. Charge pump 222 may be implemented by analog circuitry, digital circuitry, or any suitable combination thereof. Logic circuit 220 may be configured to route control signals to high side driver circuit 224 and low side driver circuit 228, which in turn may provide the control signals to the gates of switches S4 and S3. Logic circuit 220 may account for various system conditions that may otherwise pause, stop, or delay control signals from buck-boost control circuit 104. Such system conditions may include, for example, whether switching regulation is to be performed at all, whether burst mode has been entered, or other conditions. Driver circuits 214, 218, 224, 228 may be configured to buffer an amount of time between switching operations of the respective transistors in order to prevent overlap or other undesired conditions.

CBST1 and CBST2 may be bootstrap capacitors which provide voltage supply for controlling high side MOSFETs in a buck-boost power circuit, such as NMOS switches S1 and S4. The corresponding high side drivers, 214, 224 are supplied both by charge pump 212, 222 and CBST1 and CBST2 in parallel. Charge pumps 212, 222 may be configured to provide a small portion of the total charge to compensate for leakage currents in the high side gate drivers 214, 224 when S1 or S4 is activated. CBST1 and CBST2 may act as a type of charge pump for providing the main charges for activating the NMOS switches S1 and S4.

Current measurements in buck-boost power circuit 102 may be provided to buck-boost control circuit 104. Any suitable current measurements in buck-boost power circuit 102 may be used. For example, buck leg circuit 206 may provide a current measurement from current sensor 216 configured to measure current flowing from the drain of switch S1. In another example, boost leg circuit 208 may provide a current measurement from current sensor 226 configured to measure current flowing from the drain of switch S4. In yet another example, boost leg circuit 208 may provide a current measurement from sample-and-hold circuit 230 to measure current from current sensor 226 and provide the resultant sample-and-hold current to buck-boost control circuit 104.

Buck leg circuit 206 may be configured to act as a switch, denoted herein as switch A, to connect a first terminal of LSMPS to either VIN or to ground. Boost leg circuit 208 may be configured to act as a switch, denoted herein as switch B to connect a second terminal of LSMPS to either VOUT or to ground.

Figure 3:
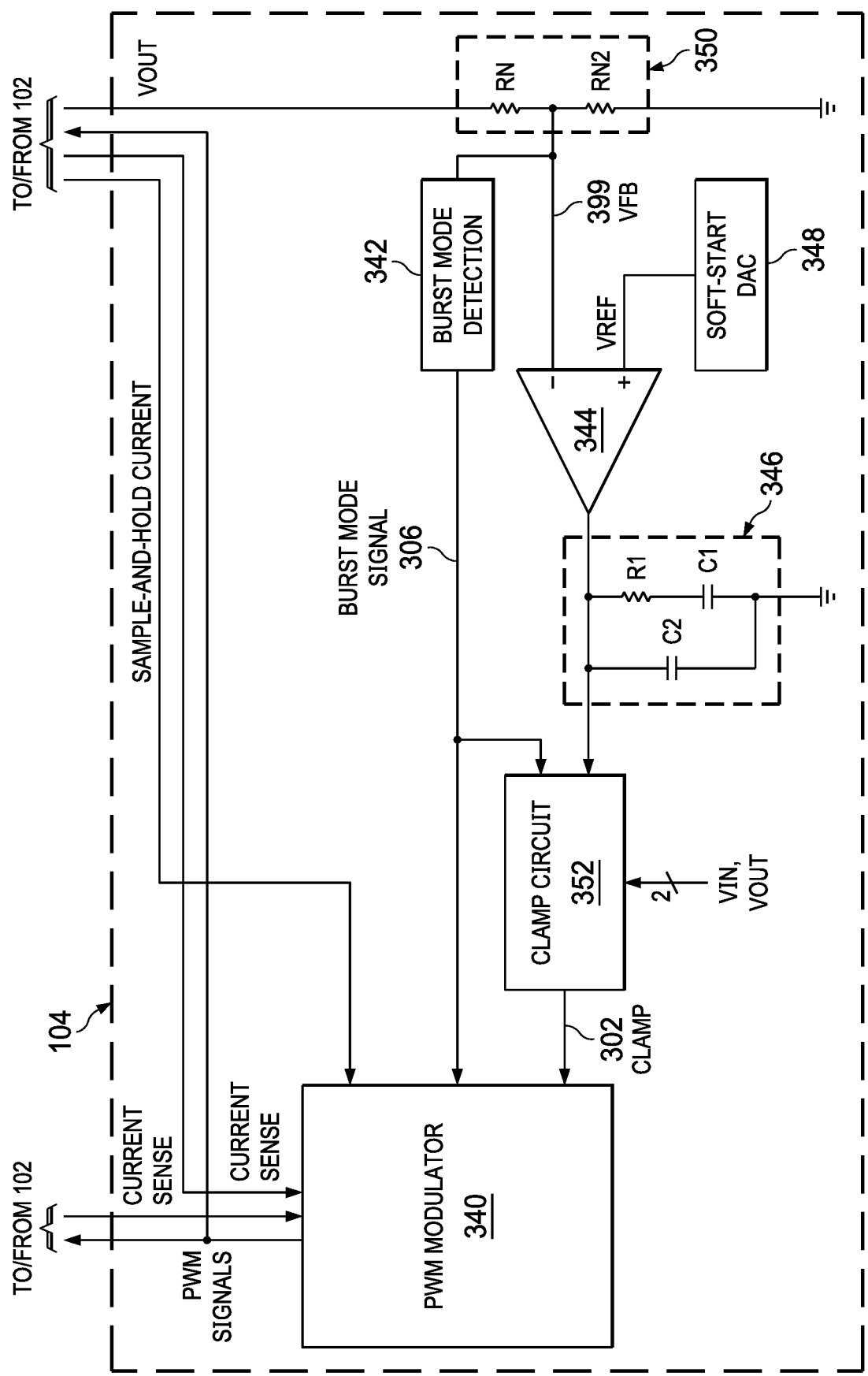
FIG. 3 is a more detailed illustration of portions of a converter, including a buck-boost control circuit, according to embodiments of the present disclosure.

FIG. 3 is a more detailed illustration of portions of converter 110, including buck-boost control circuit 104, according to embodiments of the present disclosure.

Buck-boost control circuit 104 may include a PWM modulator circuit 340. PWM modulator circuit 340 may be configured to receive sensed current input from any suitable portion of buck-boost power circuit 102. PWM modulator circuit 340 may be configured to receive a burst mode signal 306 indicating whether converter 110 is to operate in burst mode. In burst mode, switching activities may be reduced to a level necessary to match a light load applied to converter 110. Thus, the efficiency of converter 110 may be increased under light loads. PWM modulator circuit 340 may be configured to receive measurements of VIN and VOUT. PWM modulator circuit 340 may be configured to receive an indication of clamp signal 302 indicating whether voltage output is to be clamped. Based upon these inputs, PWM modulator circuit 340 may be configured to issue control signals to buck-boost power circuit 102. PWM modulator circuit 340 may be implemented by analog circuitry, digital circuitry, or any suitable combination thereof. A more detailed illustration of an example implementation of PWM modulator circuit 340 is illustrated below within the context of FIG. 5.

PWM modulator circuit 340 may be configured to receive a current setpoint value and a measurement of current. The measurement of current, as discussed above, may be received from any suitable portion of buck-boost power circuit 102. The current setpoint value may be received or generated from any suitable source. In one embodiment, PWM modulator circuit 340 may generate such a current setpoint value in the form of current ramps based upon a baseline value. The current setpoint value may be compared against the present inductor. The results of such comparison may be used to determine control switching signals to be output to buck-boost power circuit 102. The control signals issued to buck-boost power circuit 102 by PWM modulator circuit 340 may include PWM signals.

The current setpoint value may vary according to VOUT, as changes in VOUT may affect the response of inductor current, which may be used to evaluate in which mode converter 110 is to operate. Thus, PWM modulator circuit 340 may include current ramp generation circuitry to modify the current setpoint value according to changes in VOUT. The inductor current may rise when switch A is on (S1 is on and S2 is off) and switch B is off (S4 is off and S3 is on), wherein VIN is applied to LSMPS. The inductor current may fall when switch A is off (S1 is off and S2 is on) and switch B is on (S4 is on and S3 is off), wherein LSMPS is applied to VOUT. When both switch A and switch B are on, resulting in application of VIN to LSMPS and of LSMPS to VOUT, current may rise if VIN is greater than VOUT, and current may fall if VIN is less than VOUT. An initial current setpoint, from which variable setpoints in the form of current ramps may be generated, may be expressed as a voltage representing a particular current value, and available from, for example, voltage compensator (not shown), a register, or control logic. PWM modulator circuit 340 may include comparators or other suitable circuitry to compare the modified or variable current setpoint value with the sensed current value and generate control signals therefrom.

Buck-boost control circuit 104 may include a resistive network 350, including a first resistor RN and a second resistor RN2 connected in series. Resistive network 350 may operate as a voltage divider. A first end of resistor RN may be connected to VOUT and a second end of RN2 may be connected to ground, wherein the second end of resistor RN and the first end of resistor RN2 are connected at a midpoint.

Buck-boost control circuit 104 may include a burst mode detection circuit 342. Burst mode detection circuit 342 may be implemented by any suitable combination of analog and digital circuitry, and a more detailed implementation of burst mode detection circuit 342 is illustrated below within the context of FIG. 4. Burst mode detection circuit 342 may be configured to determine whether a light load has been applied to VOUT and, if so, signal to PWM modulator circuit 340 that a burst mode is to be used. Burst mode detection circuit 342 may receive an indication of VOUT as modified by resistive network 350 from the midpoint of resistive network 350. Burst mode detection circuit 342 may be configured to issue a burst-mode signal 306 to PWM modulator circuit 340.

Buck-boost control circuit 104 may include a voltage error amplifier 344. Voltage error amplifier 344 may be configured to compare a feedback voltage, VFB 399 (which may be an indication of VOUT as modified by resistive network 350 from the midpoint of resistive network 350) with a voltage reference VREF. VREF may be generated by any suitable source, such as a soft-start digital to analog converter (DAC) 348. DAC 348 may be implemented by any suitable combination of digital and analog circuitry, and may be configured to provide VREF according to a value set by a register or other suitable control. VREF may represent a desired target output voltage value for VOUT. Thus, voltage error amplifier 344 may be configured to provide an indication of the error in VOUT. PWM modulator circuit 340 may be configured to receive such an indication of the error in VOUT and use such an indication to issue control signals to buck-boost power circuit 102 so as to more precisely output VOUT.

The indication issued by voltage error amplifier 344 may be connected to a first end of a compensation network 346, wherein a second end of compensation network 346 is connected to ground. Compensation network 346 may be configured to manipulate the loop gain (including both magnitude and phase) of the control loop of converter 110 to achieve expected transient behavior and stable regulation of output voltage. Compensation network 346 may include a capacitor C2 in parallel with a series-connected resistor R1 and another capacitor C1. Each branch of compensation network 346 may be connected between output of voltage error amplifier 344 and ground.

In one embodiment, buck-boost control circuit 104 may include a clamp circuit 352. Clamp circuit 352 may be connected between output of voltage error amplifier 344 and PWM modulator circuit 340. Clamp circuit 352 may be configured to modify or optionally modify output from voltage error amplifier 344 before it reaches PWM modulator circuit 340. Clamp circuit 352 may be configured to limit the output voltage of error amplifier 344. Clamp circuit 352 may be configured to modify the output of voltage error amplifier 344 into clamp signal 302. Clamp signal 302 may be provided to PWM modulator 240. Clamp circuit 352 may be implemented by any suitable combination of analog and digital circuitry. A more detailed implementation of clamp circuit 352 is illustrated below within the context of FIG. 7.

Figure 4:
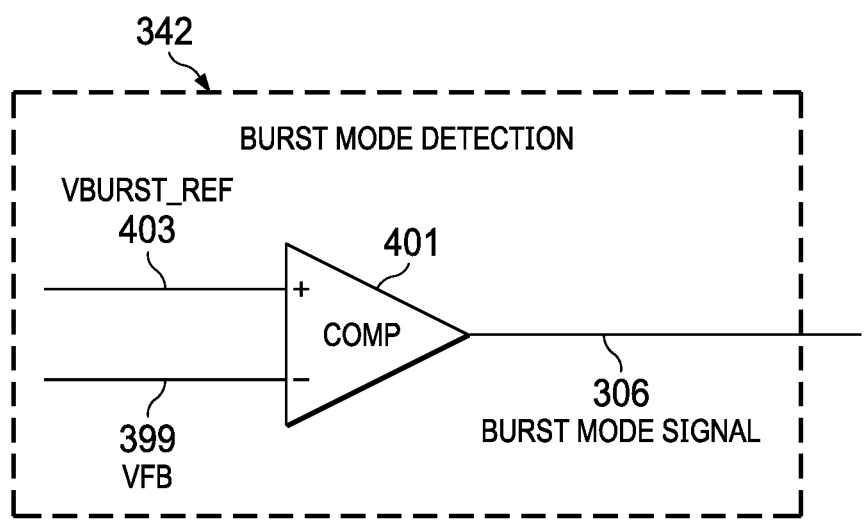
FIG. 4 is a more detailed illustration of portions of a converter, including a burst mode detection circuit, according to embodiments of the present disclosure.

FIG. 4 is a more detailed illustration of portions of converter 110, including burst mode detection circuit 342, according to embodiments of the present disclosure.

Burst mode detection circuit 342 may be configured to receive VFB 399 and a reference for burst operation, such as VBURST_REF 403. VBURST_REF 403 may be provided by any suitable portion of system 100, and may be stored in a register value. VBURST_REF 403 may reflect a value of feedback voltage VFB 399 below which converter 110 is to enter burst mode. Accordingly, burst mode detection circuit 342 may include a comparator 401 configured to provide burst mode signal 306 based on a comparison of VBURST_REF 403 and VFB 399. For example, when VBURST_REF 403 is less than VFB 399, burst mode signal 306 may be high, and converter 110 might enter burst mode. When VBURST_REF 403 is greater than VFB 399, burst mode signal 306 may be low, and converter 110 might not enter burst mode. Comparator 401 may include a hysteresis. If VFB is less than VBURST_REF 304, then burst mode signal 306 may be low, and converter 110 might leave burst mode.

Figure 5:
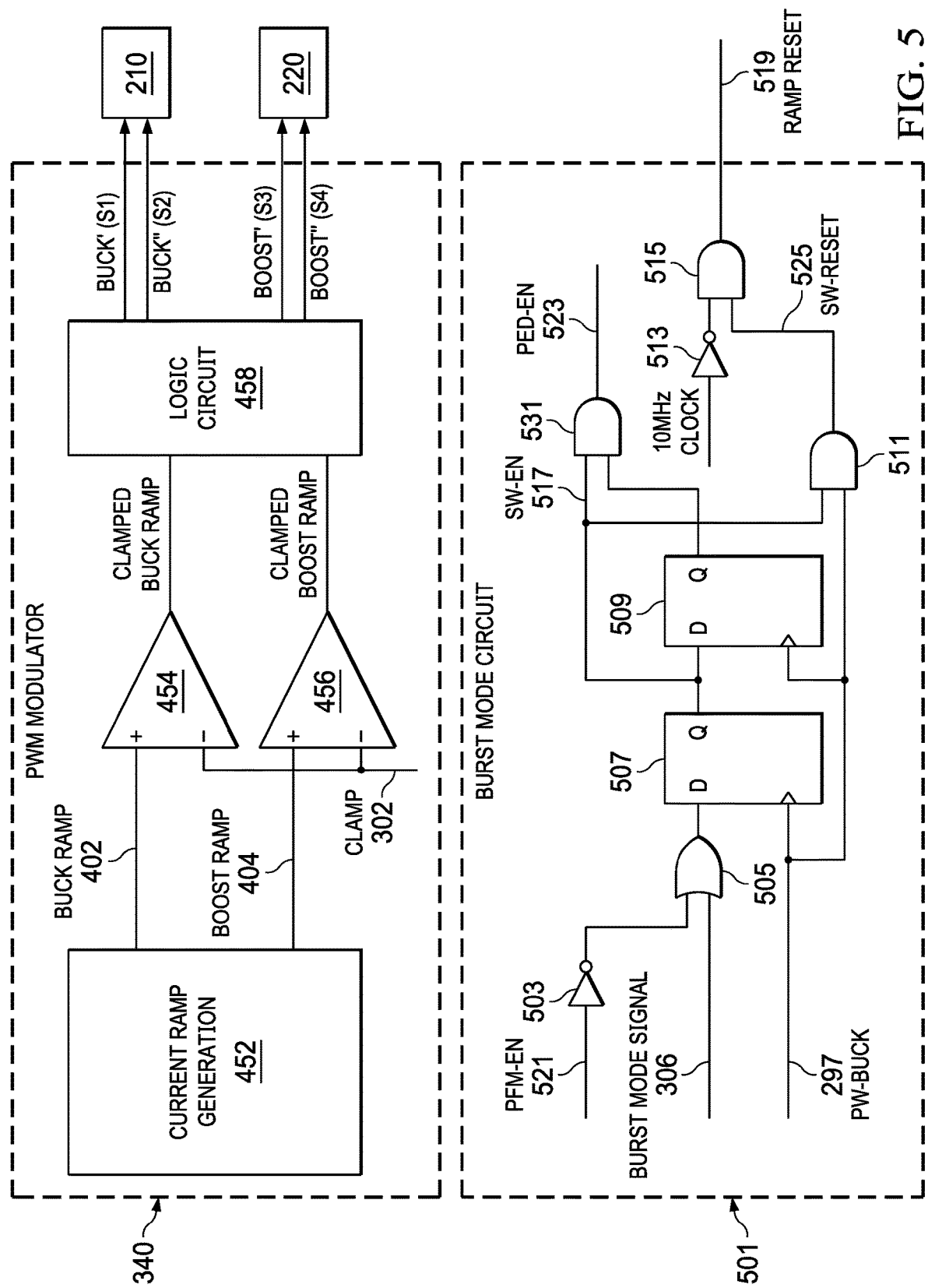
FIG. 5 is a more detailed illustration of portions of a converter, including a PWM modulator and a burst mode circuit, according to embodiments of the present disclosure.

FIG. 5 is a more detailed illustration of portions of converter 110, including PWM modulator circuit 340, according to embodiments of the present disclosure. Furthermore, FIG. 5 illustrates an example implementation of a burst mode circuit 501. Burst mode circuit 501 may be implemented within any suitable portion of converter 110, such as within PWM modulator circuit 340, or within burst mode detection circuit 342. Burst mode circuit 501 is illustrated in association with the context of the illustration of PWM modulator circuit 340 for ease of readability.

Burst mode circuit 501 may be configured to generate various signals that may be used by PWM modulator circuit 340 for the generation of current ramps, as well as other portions of converter 110. Burst mode circuit 501 may be configured to generate a ramp reset signal 519. Ramp reset signal 519 may be configured to instruct PWM modulator circuit 340 to reset the current ramp to an original setpoint. Burst mode circuit 501 may be configured to generate a PED-EN 523. PED-EN 523 may be configured to release output of functional blocks which are used in PWM mode (also known as regular mode, or non-burst mode), such as loop comparators. Burst mode circuit 501 may be configured to generate a SW-RESET signal 525. SW-RESET signal 525 may be configured to control sample and hold switch 578 (in PWM modulator circuit 340). Burst mode circuit 501 may be configured to generate SW-EN 517. SW-EN 517 may be configured to enable functional blocks which are used in PWM mode, such as the error amplifier and the two loop comparators. SW-EN 517 may change to high one clock cycle earlier in comparison to PED-EN 523, so that the enabled functional blocks will have time to start up correctly before their outputs are released. Burst mode circuit 501 may receive PW-BUCK 297, burst mode signal 306, and a PFM-EN signal 521. PW-BUCK 297 may be a clock signal used for buck leg circuit 206. It is a clock signal with 100 ns pulse at the beginning of each clock cycle. Burst mode signal 306 may indicate whether burst mode is to be entered. PFM-EN signal 521 may be an external signal to the converter. This signal enables the burst mode operation feature of converter 110. The burst mode detect circuit is only active when this signal is high. PFM-EN 521 may be inverted by an inverter 503 and OR'd with burst mode signal 306 by an OR gate 505. Output of OR gate 505 may be provided to the D input of a first flip-flop 507. PW-BUCK 297 may be applied to the clock of flip-flop 507, to the clock of a second flip-flop 509, and to an input of an AND gate 511. The Q output of flip-flop 507 may be given as SW-EN 517, and may be applied to the D input of flip-flop 509, to input of AND gate 511, and to input of another AND gate 531. The Q output of flip-flop 509 may be applied to input of AND gate 531. Output of AND gate 531 may be given as PED-EN 523. Output of AND gate 511 may be given as SW-RESET 525, and routed to input of another AND gate 515. A clock signal, such as a 10 MHz clock, may be inverted by an inverter 513 and applied to input of AND gate 515. Output of AND gate 515 may be given as ramp reset signal 519.

Accordingly, FIG. 5 illustrates how SW-EN 517, PED-EN 523, SW-RESET 525, and ramp reset signal 519 are generated from signals PFM-EN 521, burst mode signal 306, PW-BUCK 297, and a 10 MHz clock. SW-EN 517 may be high when burst mode circuitry has been disabled (PFM-EN 521 is set to zero) or low when burst mode circuitry has been enabled (PFM-EN 521 is set to one) and burst mode has been signaled to be entered (burst mode signal 306 is set to one). PW-BUCK 297 may be a clock signal applied to the clock of flip-flops 507, 509 such that SW-EN 517 is only set to high at the positive edge of PW-BUCK 297. PED-EN 523 may be a delayed signal (for one switching cycle) when SW-EN 517 changes to high. Functional blocks may be first enabled with SW-EN 517 and then one switching cycle later their output may be released so that no unstable output is seen. Ramp reset signal 519 and SW-RESET 525 may each include a pulse at the end of each switching cycle. SW-RESET 525 may have a pulse that is 50 ns long 50 ns earlier than ramp reset signal 519 pulse, and ramp reset signal 519 may be 50 ns long ending the switching cycle.

PWM modulator circuit 340 may include a current ramp generation circuit 452. Current ramp generation circuit 452 may be implemented by any suitable combination of analog and digital circuitry. A more detailed example implementation of current ramp generation circuit 452 is shown below within the context of FIG. 6. Current ramp generation circuit 452 may be configured to receive (not shown) one or more of a sensed current, VIN, VOUT, clamp signal 302, ramp reset signal 519, PED-EN 523, SW-RESET 525, and SW-EN 517. Current ramp generation circuit 452 may be configured to issue a reference current value that changes over time for use with buck leg circuit 206. Such a reference current value may be given as buck ramp 402. Current ramp generation circuit 452 may be configured to issue a reference current value that changes over time for use with boost leg circuit 208. Such a reference current value may be given as boost ramp 404.

In one embodiment, PWM modulator circuit 340 may be configured to clamp the outputs of buck ramp 402 and boost ramp 404. PWM modulator circuit 340 may include a differential amplifier 454 configured to clamp buck ramp 402 according to the value of clamp signal 302, yielding a clamped buck ramp. PWM modulator circuit 340 may include a differential amplifier 456 configured to clamp boost ramp 404 according to the value of clamp signal 302, yielding a clamped boost ramp. The clamped ramp signals may be provided to a logic circuit 458. Logic circuit 458 may be configured to compare the clamped ramp signals against a presently detected current value and issue control signals accordingly so as to operate converter 110 in boost mode, buck mode, or buck-boost mode.

The control signals may be provided respectively to logic circuits 210, 220 of buck leg 206, boost leg 208. A buck' signal may be provided for S1, and a buck'' signal (which is the inverse or nearly the inverse of buck') may be provided for S2. A boost' signal may be provided for S3, and a boost'' signal (which is the inverse or nearly the inverse of buck') may be provided for S4.

In one embodiment, the current value used by current ramp generator circuit 452 may be the current value sensed by sample-and-hold circuitry 230 and may reflect the sensed current at the end of each switching cycle. In another embodiment, the current value used by current ramp generator circuit 452 may be the current value sensed by sample-and-hold circuitry 230 and may reflect the average current value for the cycle. PWM modulator circuit 340 may use the sensed current from the previous switching cycle as a starting point from which to generate current ramps in the present switching cycle. Current ramp generator circuit 452 may be configured to generate buck ramp 402 and boost ramp 404 based upon the sensed current, VIN, and VOUT.

Figure 6:
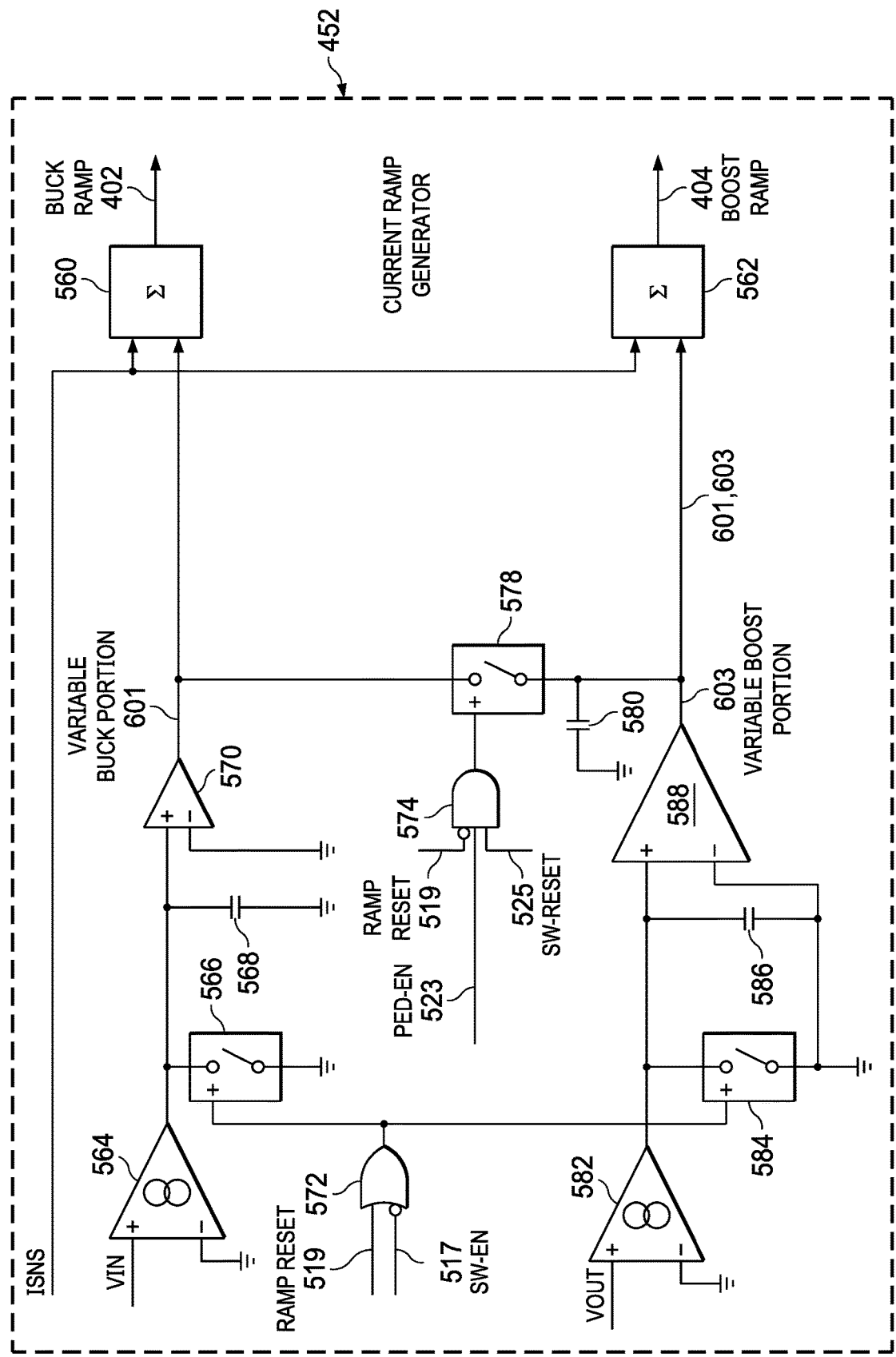
FIG. 6 is a more detailed illustration of portions of a converter, including a current ramp generator circuit, according to embodiments of the present disclosure.

FIG. 6 is a more detailed illustration of portions of converter 110, including current ramp generator circuit 452, according to embodiments of the present disclosure.

Converter 110 may be configured to generate two artificial ramps to emulate the inductor current every switching cycle. The slopes of the artificial ramps are decided by VIN and VOUT via current sources 564, 582 and respective capacitors 568, 586. The starting point of the ramps are decided by the sensed current. The two ramps are generated via summers 560, 562. At the end of each switching cycle, the capacitors 568, 586 are reset via switches 566, 584 so that they are prepared for ramp generation in the next switching cycle. Switch 578 and capacitor 580 are used to sample the peak of the output of a voltage buffer 570 at the end of each switching cycle. The sampled peak is held in capacitor 580 and added to the output of another voltage buffer 588. In this way, boost ramp 404 is superposed to buck ramp 402, as the pedestal added to the boost ramp is sampled from the peak of the buck ramp every switching cycle.

As discussed above, current ramp generator circuit 452 may be configured to generate a buck current ramp in part by charging and discharging a capacitor 568 using a current source 564 that is dependent upon VIN. Charging or discharging capacitor 568 may be implemented by a switch 566 connected between current source 564 and capacitor 568. Capacitor 568 may be connected at first end to output of current source 564 and at a second end to ground. Discharge of capacitor 568 may be routed through buffer 570 to a summer 560, wherein the discharge will be added to the sensed current. Output of summer 560 may be buck ramp 402. Control of switch 566 may be performed according to any suitable reset signals. For example, control of switch 566 may be given by an OR gate 572, whose inputs are ramp reset signal 519 and an inverted SW-EN 517 input. This combination of signals and logic may control switch 566 to charge capacitor 568 and then discharge capacitor 568 to generate a ramp signal according to desired switching cycles. Switch 566 may discharge capacitor 568 at the end of each switching period by connecting capacitor 568 to ground. Accordingly, at the beginning of the next switching period, a ramp value will begin with the sampled inductor current from the present switching period.

Current ramp generator circuit 452 may be configured to generate a boost current ramp in part by charging and discharging a capacitor 586 using a current source 582 that is dependent upon VOUT. Charging or discharging capacitor 586 may be implemented by a switch 584 connected between current source 582 and capacitor 586. Capacitor 586 may be connected at first end to output of current source 582 and at a second end to ground. Discharge of capacitor 586 may be routed through a buffer 588 to a summer 562, wherein the discharge will be added to the sensed current. Output of summer 562 may be boost ramp 404. Control of switch 584 may be performed according to any suitable reset signals. For example, control of switch 584 may be given by an OR gate 572, whose inputs are ramp reset signal 519 and an inverted SW-EN 517 input. This combination of signals and logic may control switch 584 to charge capacitor 586 and then discharge capacitor 586 to generate a ramp signal according to desired switching cycles. Switch 584 may discharge capacitor 586 at the end of each switching period by connecting capacitor 586 to ground. Accordingly, at the beginning of the next switching period, a ramp value will begin with the sampled inductor current from the present switching period.

In one embodiment, the ramped part of boost ramp 404 is to be added to the ramped part of buck ramp 402 to accomplish boost ramp 404. Such a ramped part of boost ramp 404 might not include the baseline value of the sensed current, and such a ramped part of buck ramp 402 might not include the baseline value of the sensed current. Accordingly, output of buffer 570 may be given as variable buck portion 601, and output of buffer 588 may be given as variable boost portion 603. Variable boost portion 603 may be added to variable buck portion 601, and the result input into summer 562. This may be implemented in any suitable manner. For example, a switch 578 may alternatively charge a capacitor 580 with the value of variable buck portion 601 and discharge capacitor 580 to a connection with variable boost portion 603. The currents thereof may combine. Switch 578 and capacitor 580 may form a sample and hold circuit. At the end of each switching cycle, switch 578 may be switched on, for example, for approximately 50-100 nanoseconds. This allows the peak of variable buck portion 601 to be sampled. Afterwards, at the beginning of the next switching period, the voltage stored in capacitor 580 may be discharged and added as a pedestal for boost ramp 404.

Control of switch 578 may be implemented in any suitable manner. For example, logic including an AND gate 574 with an inverted input of ramp reset signal 519, input of PED-EN 523, and input of SW-RESET 525 may be output to drive switch 578. When the PWM mode is active and all functional blocks are ready to operate (wherein PED-EN 523 is set to one) the combination of inverted ramp reset signal 519 and SW-RESET 525 generated a 50 ns pulse 50 ns prior to the end of switching cycle to enable switch 578 and sample the output of buffer 570.

With SW-RESET 525 and an inverted ramp reset signal 519 combined via AND gate 574, a 50 ns pulse is generated before the ramp reset signal 519 pulse and is used to sample the peak of the buck ramp. After the peak of the buck ramp is sampled SW-RESET 525 changes to zero and holds the sampled peak voltage in element 580. The ramp reset signal 519 pulse then resets the artificial ramps in the last 50 ns of every switching cycle via switches 566 and 584.

Figure 7A:
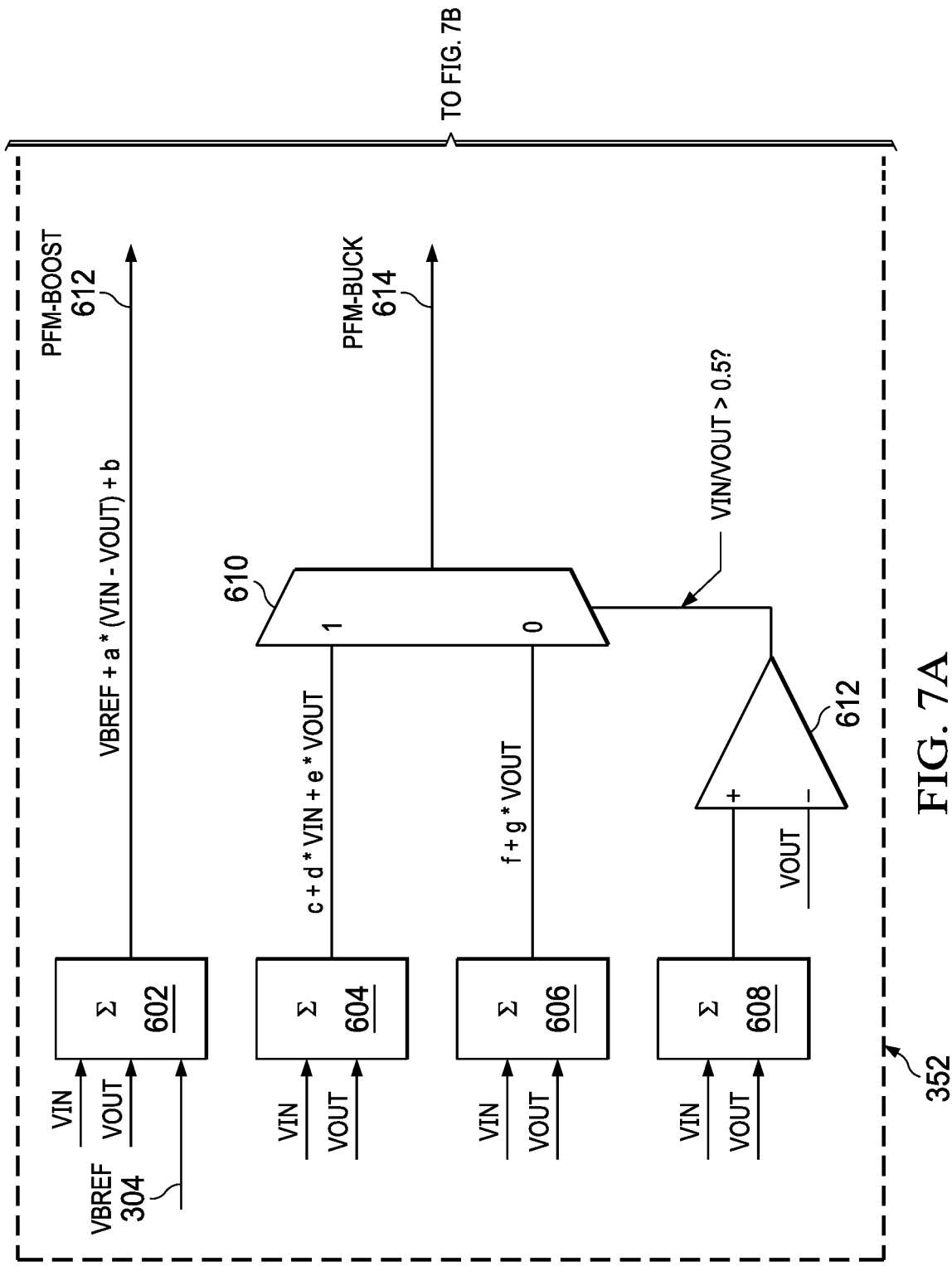
FIGS. 7A and 7B are more detailed illustrations of portions of a converter, including a clamp circuit, according to embodiments of the present disclosure.
Figure 7B:
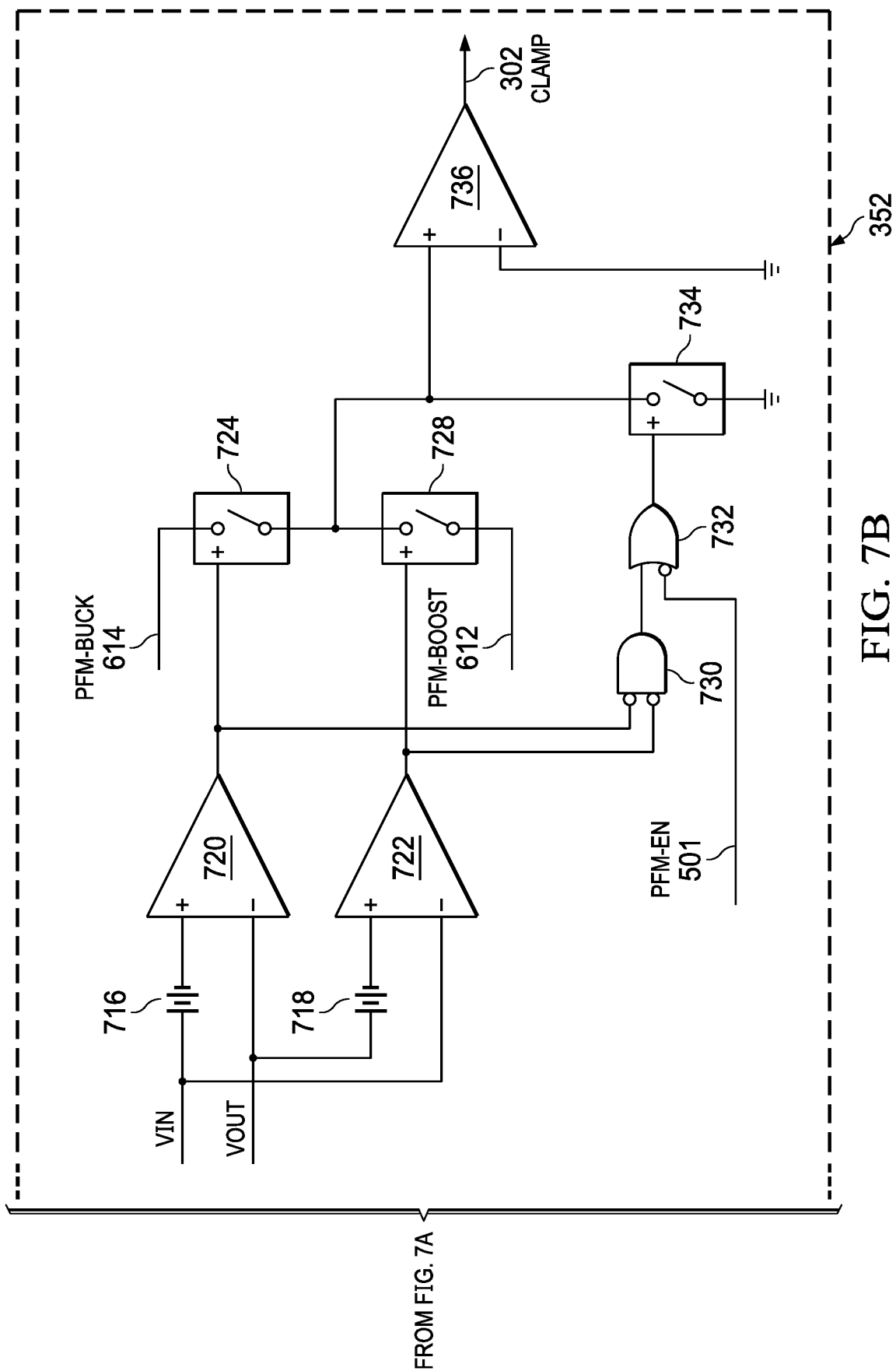

FIGS. 7A and 7B are more detailed illustrations of portions of converter 110, including clamp circuit 352, according to embodiments of the present disclosure. Clamp circuit 352 may be configured to support burst mode when a load attached to converter 110 becomes low. VBREF may be the sampled peak of buffer 570 from FIG. 6. Based on VIN, VOUT, and the expected load level, defined by where converter 110 is to enter burst mode according to a design of converter 110. Converter 110 may enter burst mode when the load on converter 110 is lower than a defined threshold. Furthermore, based on VIN and VOUT, clamp circuit 352 may be configured to calculate a duty ratio needed to balance a minimum load, and, in turn, a necessary value of error amplifier output, such as output of amplifier 344 that otherwise needed to support such a minimum load. Clamp circuit 352 may include any suitable number of operational parameters, constants, or other values to perform clamping in support of these operations. The operational parameters or constants may be determined by sweeping the range of possible values of VIN and VOUT, and calculating how error amplifier output, such as output of amplifier 344 should be modified so as to perform clamping. These may result in a curve for clamping voltage as a function of VIN. Separate curves may be calculated for boost and for buck operation. Moreover, in one embodiment the curves may be linearly approximated so as to make the implementation of such functions simple within analog circuitry.

Figure 8:
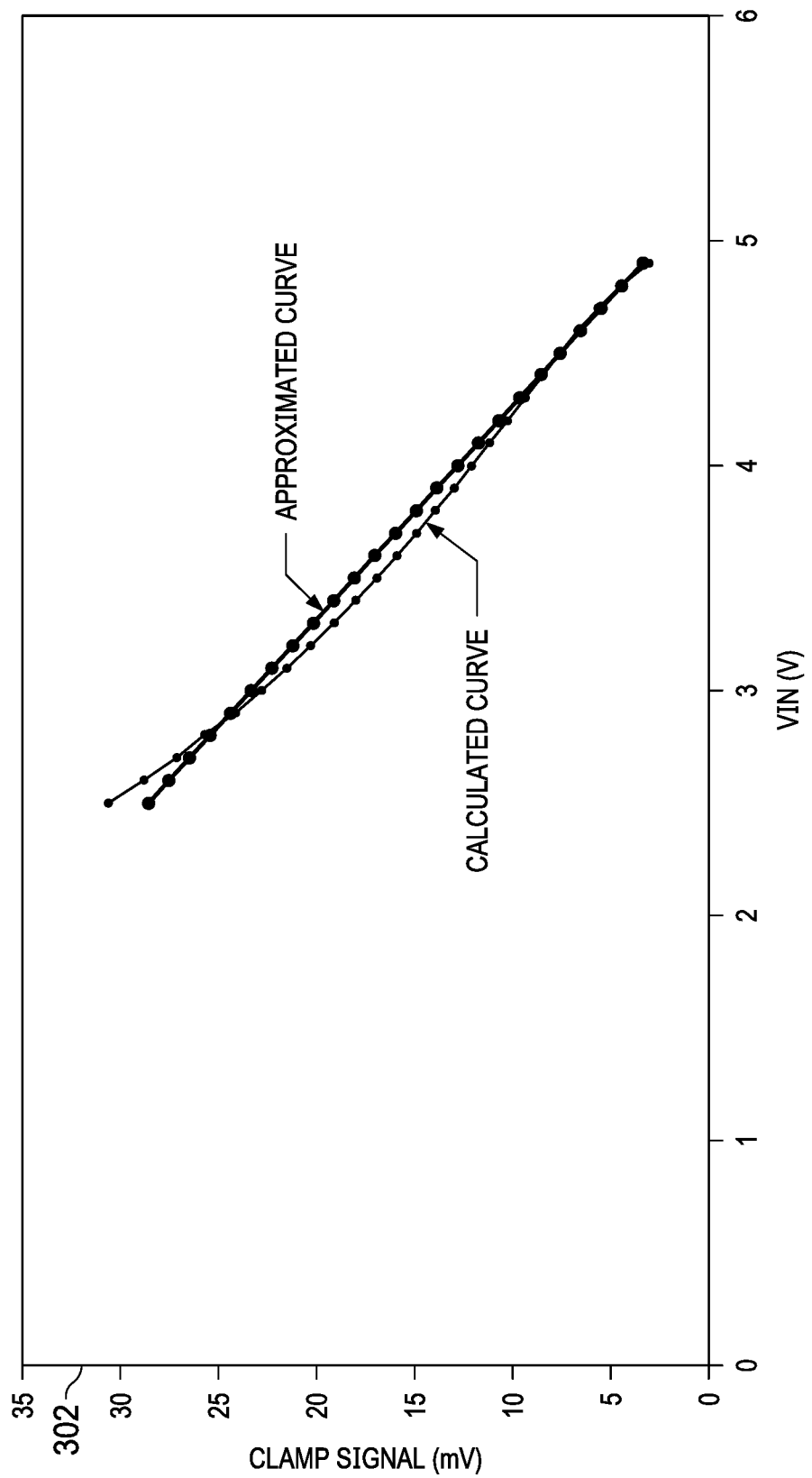
FIG. 8 illustrates an example curve for a clamp signal for boost operation for different values of VIN, given a five-volt VOUT, according to embodiments of the present disclosure.

FIG. 8 illustrates an example curve for clamp signal 302 for boost operation for different values of VIN, given a five-volt VOUT, according to embodiments of the present disclosure. The x-axis illustrates values of VIN, and the y-axis illustrates values of clamp signal 302 expressed in millivolts.

Figure 9:
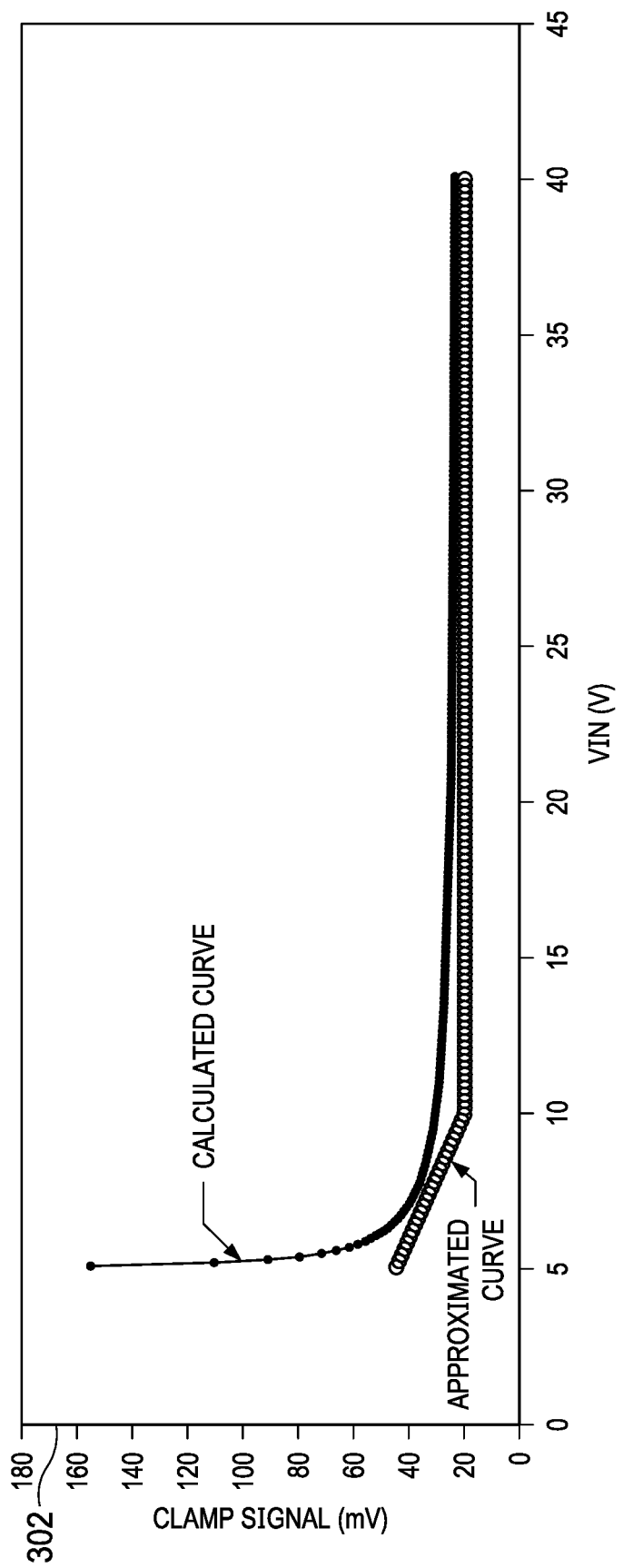
FIG. 9 illustrates an example curve for a clamp signal for buck operation for different values of VIN, given a five-volt VOUT, according to embodiments of the present disclosure.

FIG. 9 illustrates an example curve for clamp signal 302 for buck operation for different values of VIN, given a five-volt VOUT, according to embodiments of the present disclosure. The x-axis illustrates values of VIN, and the y-axis illustrates values of clamp signal 302 expressed in millivolts.

Returning to FIGS. 7A and 7B, clamp circuit 352 may be configured to generate a value for clamp signal 302 for boost operation, denoted as PFM-BOOST 612. Clamp circuit 352 may be configured to generate a value for clamp signal 302 for buck operation, denoted as PFM-BUCK 614.

To generate PFM-BOOST 612, a summer 602 may take VIN, VOUT, and VBREF 304 as input, and calculate PFM-BOOST 612 as the value of VBREF+a*(VIN−VOUT)+b, wherein a and b are constants determined during a sweep of possible VIN and VOUT values and curve-fitting such as shown in FIG. 8.

Generation of PFM-BUCK 614 may be conditional based upon relative values of VIN and VOUT. Such a conditional operation may be implemented by selecting between two different linear approximations with a multiplexer 610. Multiplexer 610 may be controlled by an evaluation of the relative values of VIN and VOUT. For example, if VIN/VOUT is greater than 0.5 (that is, VOUT is at least twice as large as VIN), a first value may be output as PFM-BUCK 614. Otherwise, a second value may be output as PFM-BUCK.

The first value that may be output as PFM-BUCK 614, when VIN/VOUT is greater than 0.5, may be provided by a summer 604 configured to calculate the value of c+d*VIN+e*VOUT, wherein c, d, and e are constants determined during a sweep of possible VIN and VOUT values and curve-fitting such as shown in FIG. 9.

The second value that may be output as PFM-BUCK 614, when VIN/VOUT is not greater than 0.5, may be provided by a summer 606 configured to calculate the value of f+g*VOUT, wherein f and g are constants determined during a sweep of possible VIN and VOUT values and curve-fitting such as shown in FIG. 9.

Any suitable mechanism or circuitry may be used to determine whether to apply PFM-BUCK 614, PFM-BOOST 612, or neither as clamp signal 302. For example, if VIN is greater than VOUT as evaluated by a comparator 720, then switch 724 may be activated to route PFM-BUCK 614 to output as clamp signal 302. A hysteresis voltage, provided by a voltage source 716, may be added to VIN for comparison to VOUT by comparator 720. If VIN is less than VOUT as evaluated by a comparator 722, then switch 728 may be activated to route PFM-BOOST 612 to output as clamp signal 302. A hysteresis voltage such as 100 mV, provided by a voltage source 718, may be added to VOUT for comparison to VIN by comparator 722. The hysteresis may be provided instead by dividing down VIN and VOUT and implementing hysteresis via comparators or voltage dividers. Output as clamp signal 302 may be first amplified by an error amplifier 736.

Furthermore, if VIN and VOUT have similar values, within the hysteresis values provided by voltage sources 716, 718 such that neither of switches 724, 726 are activated, clamp signal 302 may be set to zero. This may be accomplished with a switch 734 configured to ground non-inverting input to error amplifier 736. The inverting input of error amplifier 736 may be grounded. Output of comparators 720, 722 may be routed to an AND gate 730 with inverting inputs, and output from AND gate 730 may be routed to input of an OR gate 732. Output of OR gate 732 may drive control of switch 734. OR gate 732 may also accept as input PFM-EN 501. Thus, upon VIN and VOUT being close to each other in value (within the hysteresis values provided by voltage sources 716, 718), or upon assertion of PFM-EN 501, clamp signal 302 may be set to zero.

Figure 10:
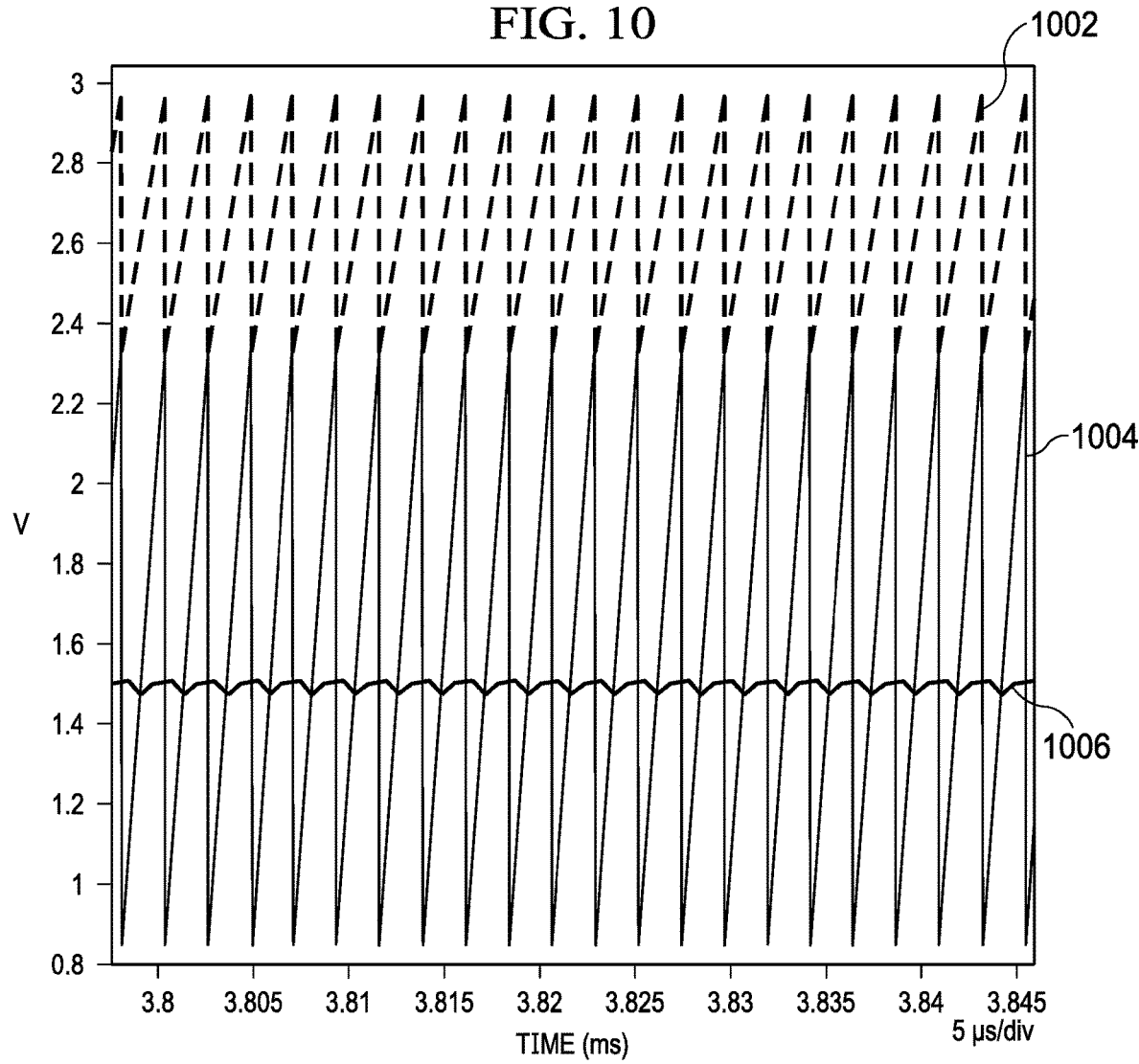
FIG. 10 illustrates example operation of a converter, including generation of buck and boost ramps, according to embodiments of the present disclosure.

FIG. 10 illustrates example operation of converter 110, including generation of buck and boost ramps, according to embodiments of the present disclosure. Graphed in FIG. 10 are a plot 1002 of a boost current ramp, such as boost ramp 404; plot 1004 of a buck current ramp, such as buck ramp 402; and plot 1006 of output from an error amplifier, such as output of amplifier 344. In one embodiment, error amplifier output, such as output of amplifier 344 as plotted may be clamped by clamp circuit 352 to yield clamp signal 302. FIG. 10 may be illustrated for VIN of 14 volts, VOUT of 6 volts, and a 10-ohm resistive load. As shown in FIG. 10, the boost current ramp of plot 1002 is perfectly, or nearly perfectly superposed to the buck current ramp of plot 1004.

Figure 11:
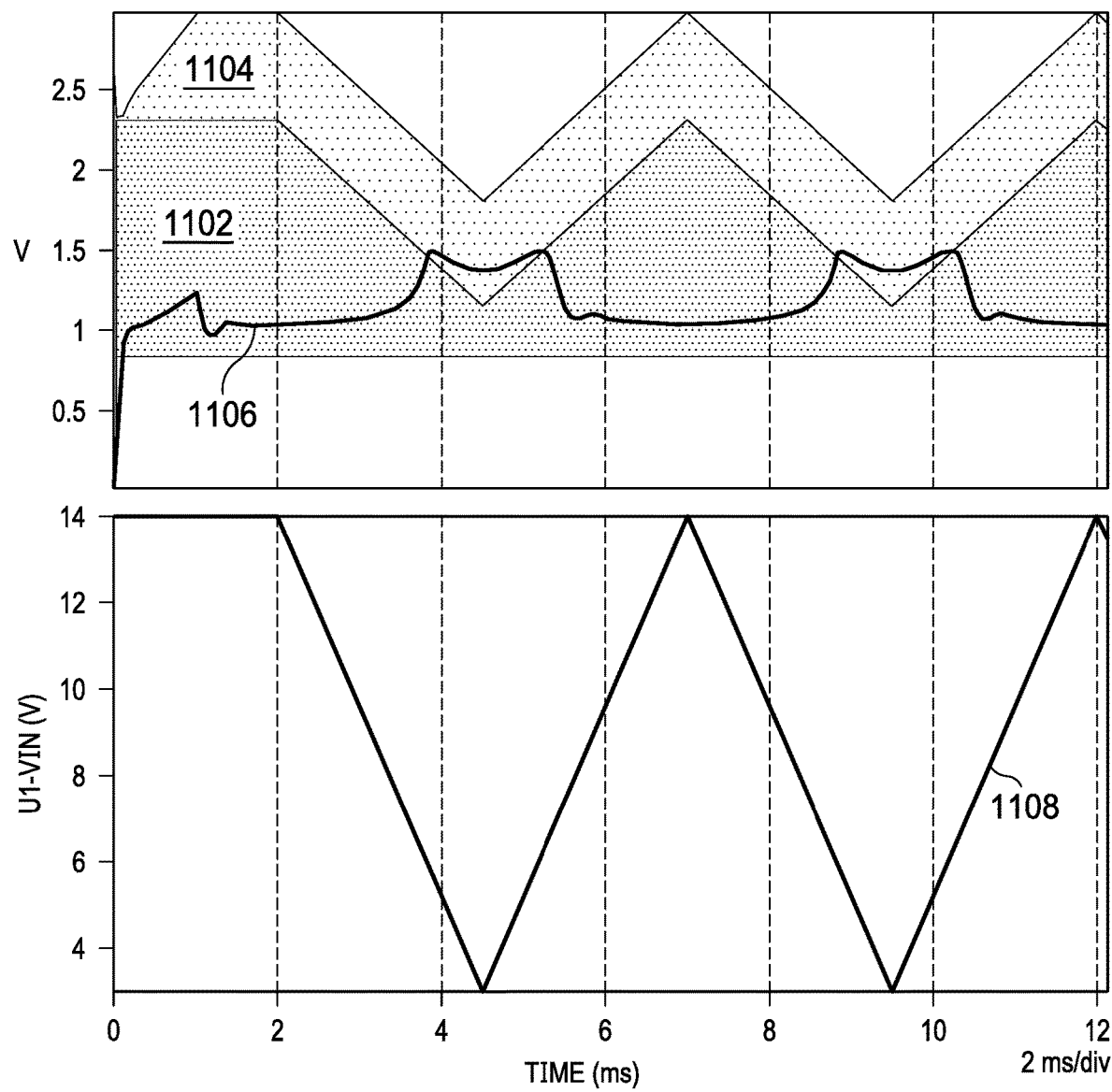
FIG. 11 illustrates example operation of a converter, including yet further details of buck and boost ramps, according to embodiments of the present disclosure.

FIG. 11 illustrates example operation of converter 110, including yet further details of buck and boost ramps, according to embodiments of the present disclosure. FIG. 11 may illustrate general operation of buck and boost ramps. In FIG. 11, VIN may ramp from 3 volts to 14 volts, and back down to 3 volts. VOUT may be held constant at 6 volts. FIG. 11 may illustrate the relationship between VIN, VOUT, and the buck and boost ramps. The buck ramp is related to VIN and the slope or peak is high when VIN is high. VOUT may be relatively constant as it is the regulated output voltage of the converter. As it defines the slope or peak of the boost ramp, the boost ramp shown in the figure keeps its slope or peak. A pedestal between the ramps is shown.

Graphed in FIG. 11 are a plot 1102 of a buck current ramp, such as buck ramp 402; plot 1104 of a boost current ramp, such as boost ramp 404; and plot 1106 of error amplifier output, such as output of amplifier 344. Furthermore, plot 1108 is plotted over the same time on a different scale, illustrating the changing value of VIN. As 1106 is the output of the error amplifier, depending on the input voltage and the load condition, error amplifier output is adjusted by the control loop in a way so that the output voltage of the converter is well regulated to the expected level. When plot 1106 crosses 1102, the duty cycle changes continuously and in this way the output voltage is regulated under different input voltage and load conditions. As plot 1106 moves from plot 1102 to plot 1104, converter 110 moves from buck operation to boost operation.

As VIN decreases, current through LSMPS may decrease, and thus plot 1102 representing the buck current ramp may also decrease. As VIN increases, current through LSMPS may increase, and thus plot 1102 may also increase. The absolute value of plot 1104 may follow plot 1102, but the differential between plot 1104 and plot 1102 may stay the same, as the portion of the ramp due to the boost current ramp may stay the same, and as the boost current ramp is superposed on top of the buck current ramp.

By adding variable boost portion 603 to variable buck portion 601, a smooth transition from buck mode to boost mode, and from boost mode to buck mode, may be accomplished.

Figure 12:
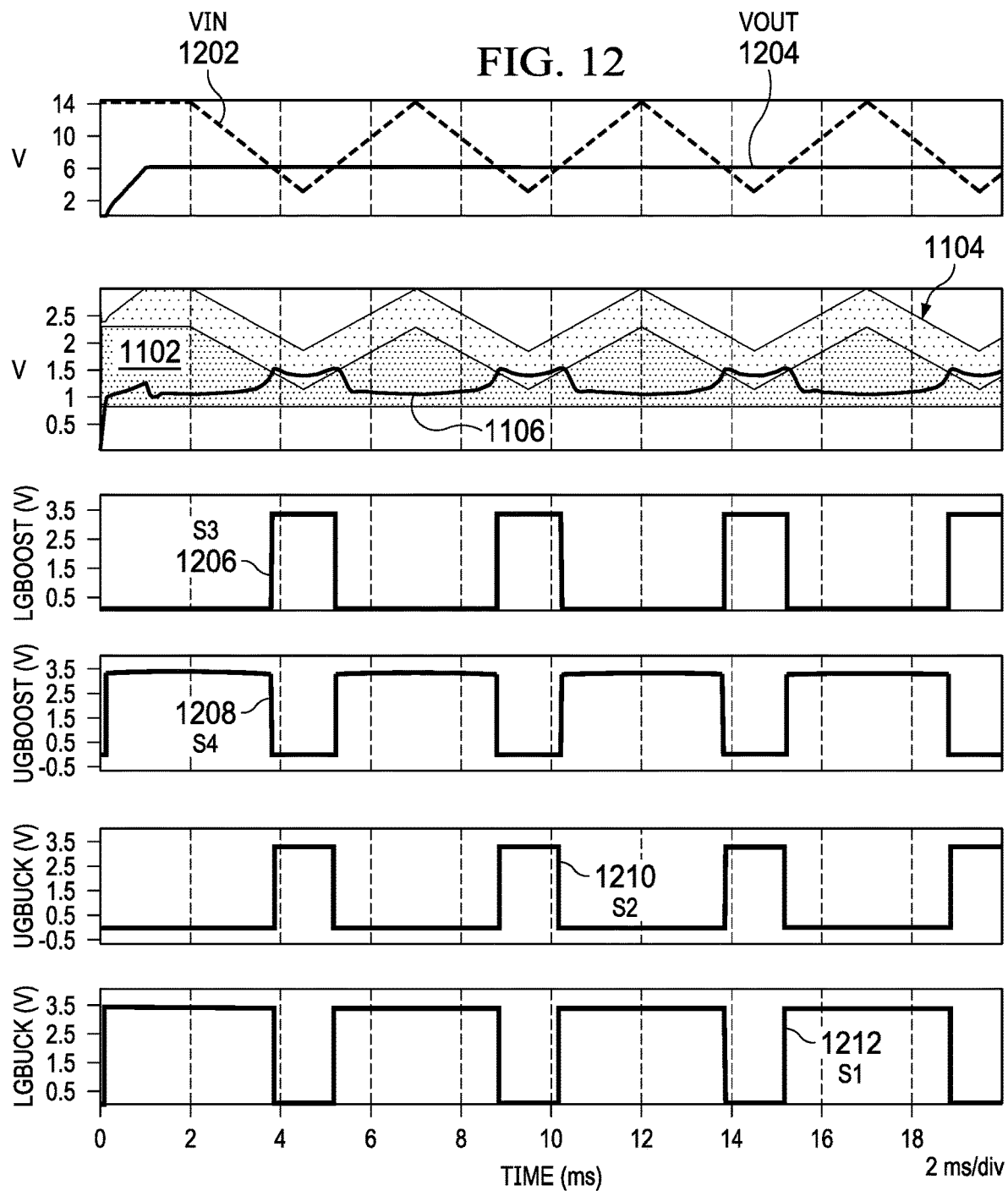
FIG. 12 illustrates example operation of a converter, including transitions between operational modes, according to embodiments of the present disclosure.

FIG. 12 illustrates example operation of converter 110, including transitions between operational modes, according to embodiments of the present disclosure. FIG. 12 illustrates plot 1202 for VIN starting at 14V, ramping down to 3V, back to 14V, and repeating. Furthermore, plot 1202 shows, after start-up and initial ramp-up, VOUT being held steady at approximately 6V. Plots 1102, 1104, 1106 from FIG. 12 are reproduced here for reference. Plot 1206 may illustrate a gate control signal (and thus of operation of) S3, the boost leg low side switch of boost leg circuit 208. Plot 1208 may illustrate a gate control signal of S4, the boost leg high side switch of boost leg circuit 208. Plot 1210 may illustrate a gate control signal of S2, the buck leg low side switch of buck leg circuit 206. Plot 1212 may illustrate a gate control signal of S1, the buck leg high side switch of buck leg circuit 206.

As shown in FIG. 12, when VIN in plot 1202 is greater than VOUT in plot 1204, S1 may be on (shown by plot 1212) and S2 may be off (shown by plot 1210). Accordingly, boost leg circuit 206 may be activated. Moreover, S3 may be off (shown by plot 1206) and S4 may be on (shown by plot 1208). Thus, boost leg circuit 208 may be deactivated. Converter 110 may be operating in buck mode. As VOUT 1204 increases initially to 6 volts, the current ramp of boost ramp 1104 may increase relative to the current ramp of buck ramp 1102. After VOUT (1204) reaches 6 volts and stays constant, boost ramp 1104 may stay the same relative to buck ramp 1102. This may be because the incremental portion of boost ramp 1104 is added to buck ramp 1102, wherein buck ramp 1102 acts as a base or pedestal value for the incremental portion of boost ramp 1104. As VIN 1102 falls, buck ramp 1202 may fall.

As discussed above, plot 1106 may illustrate error amplifier output. Plot 1106 may rise rapidly when VIN 1202 falls below VOUT 1204. At a point in time around 4 milliseconds, plot 1106 may cross the threshold established by buck ramp 1202. This may cause the boost mode to start. Shortly thereafter, plot 1106 may cross the threshold established by boost ramp 1104. This may cause buck mode to start. After this time until approximately 5.5 milliseconds, S3 1206 may be on and S4 1208 may be off, activating boost leg circuit 208 to discharge LSMPS to VOUT. S1 1212 may be off and S2 1210 may be on, deactivating buck leg circuit 206 to isolate VIN from LSMPS. Converter 110 may be operating in boost mode. During an interim, wherein plots overlap and S1 1212 is on, S2 1210 is off, S3 1206 is on, and S4 1208 is off, converter 110 may be operating in buck-boost mode. The duration of this mode may be lessened in converter 110 as shown in FIG. 12.

VIN 1302 may begin to rise again. Buck ramp 1102 may also begin to rise. At a point in time around 5.5 milliseconds, VIN 1202 may exceed VOUT 1204. Plot 1106 may rapidly fall. Plot 1106 may cross the threshold established by boost ramp 1104. This may cause buck mode to start. Shortly thereafter, plot 1106 may cross the threshold established by buck ramp 1102. This may cause boost mode to start. After this time until approximately 9 milliseconds, S3 1206 may be off and S4 1208 may be on, deactivating boost leg circuit 208 to isolate LSMPS from VOUT. S1 1212 may be on and S2 1210 may be off, activating buck leg circuit 206 to apply VIN to LSMPS. Converter 110 may be operating in buck mode. During an interim, wherein plots overlap and S1 1212 is on, S2 1210 is off, S3 1206 is on, and S4 1208 is off, converter 110 may be operating in buck-boost mode. The duration of this mode may be lessened in converter 110 as shown in FIG. 12.

Figure 13:
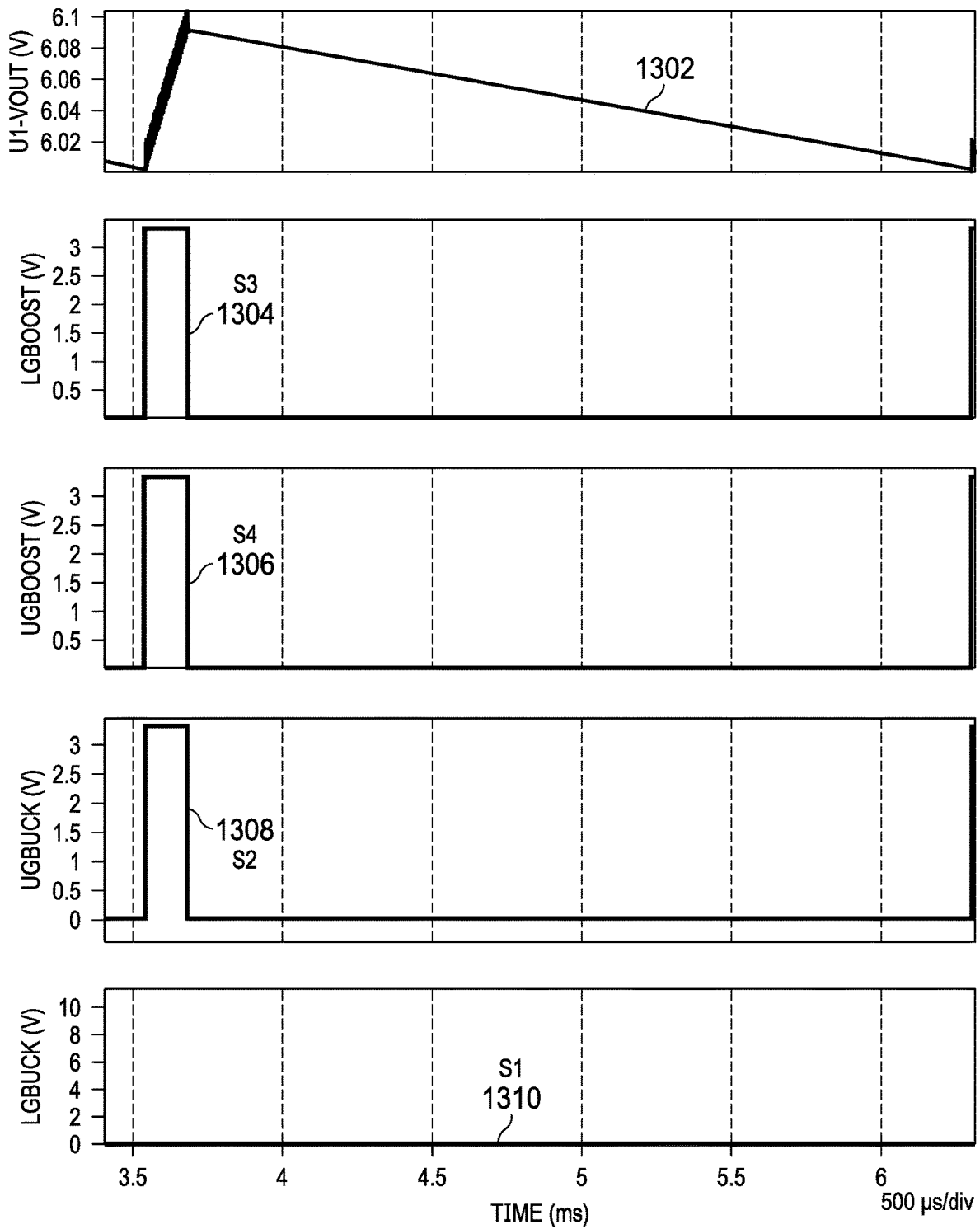
FIG. 13 illustrates example operation of a converter, including burst mode in light load conditions for boost operation mode, according to embodiments of the present disclosure.

FIG. 13 illustrates example operation of converter 110, including burst mode in light load conditions for boost operation mode, according to embodiments of the present disclosure. Plot 1302 may illustrate VOUT. VOUT 1302 may be approximately 6V. VIN may be 3V. A resistive load may be 6 KOhm, and may be a threshold level for which burst mode is entered. This threshold may be adjustable. Plot 1304 may illustrate a control signal for a low side boost leg switch such as S3. Plot 1306 may illustrate a control signal for a high side boost leg switch such as S4. Plot 1308 may illustrate a control signal for a low side buck leg switch such as S2. Plot 1310 may illustrate a control signal for a high side buck leg switch such as S1.

Burst mode may be entered shortly after 3.5 milliseconds. VOUT 1302 may have been falling. VOUT 1302 may have reached a lower threshold. Burst mode may be entered to briefly increase VOUT 1302. In regular boost mode or buck mode, either boost leg switches or buck leg switches are switching continuously with the switching frequency. In burst mode, the switching is stopped when VOUT is above a defined threshold and the switching is started again when VOUT is below another defined threshold. S1 1310 is off, and S2 1308 is on for about 150 ns. During the time S2 1308 is on, S3 1304 and S4 1306 are switching complementary. Converter 110 is working in boost operation. VOUT 1302 may rise slightly but sharply. Upon reaching an upper threshold, S1 1310, S2 1308, S3 1304, and S4 1306 are turned off. VOUT 1302 may slowly decrease due to existing load at the output of converter 110.

Figure 14:
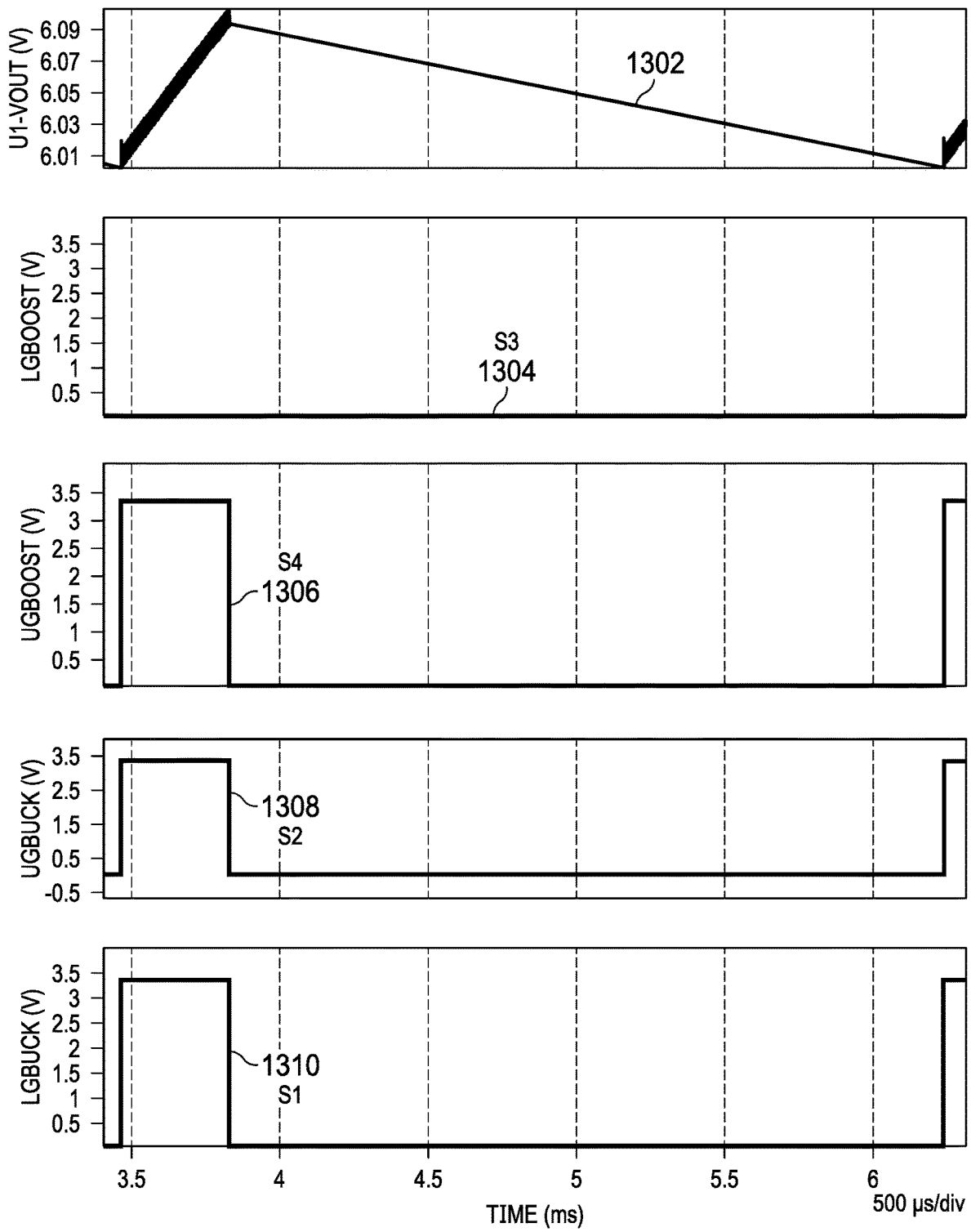
FIG. 14 illustrates example operation of a converter, including burst mode in light load conditions for buck operation mode, according to embodiments of the present disclosure.

FIG. 14 illustrates example operation of converter 110, including burst mode in light load conditions for buck operation mode, according to embodiments of the present disclosure. Plots 1302-1310 from FIG. 13 may be used again in FIG. 14. VIN may be 14V. The resistive load may again be 6 KOhms, meeting and adjustable threshold level for which burst mode is entered.

Burst mode may be entered shortly before 3.5 milliseconds. VOUT 1302 may have been falling. VOUT 1302 may have reached a lower threshold. Burst mode may be entered to briefly increase VOUT 1302. S3 1304 is off, and S4 1306 is on for about 300 ns. During the time S4 1306 is on, S1 1310, and S2 1308 are switching complementary. Converter 110 is working in buck operation. VOUT 1302 may rise slightly but sharply. Upon reaching an upper threshold, S1 1310, S2 1308, S3 1304, and S4 1306 are turned off. VOUT 1302 may slowly decrease due to existing load at the output of the converter.

Figure 15:
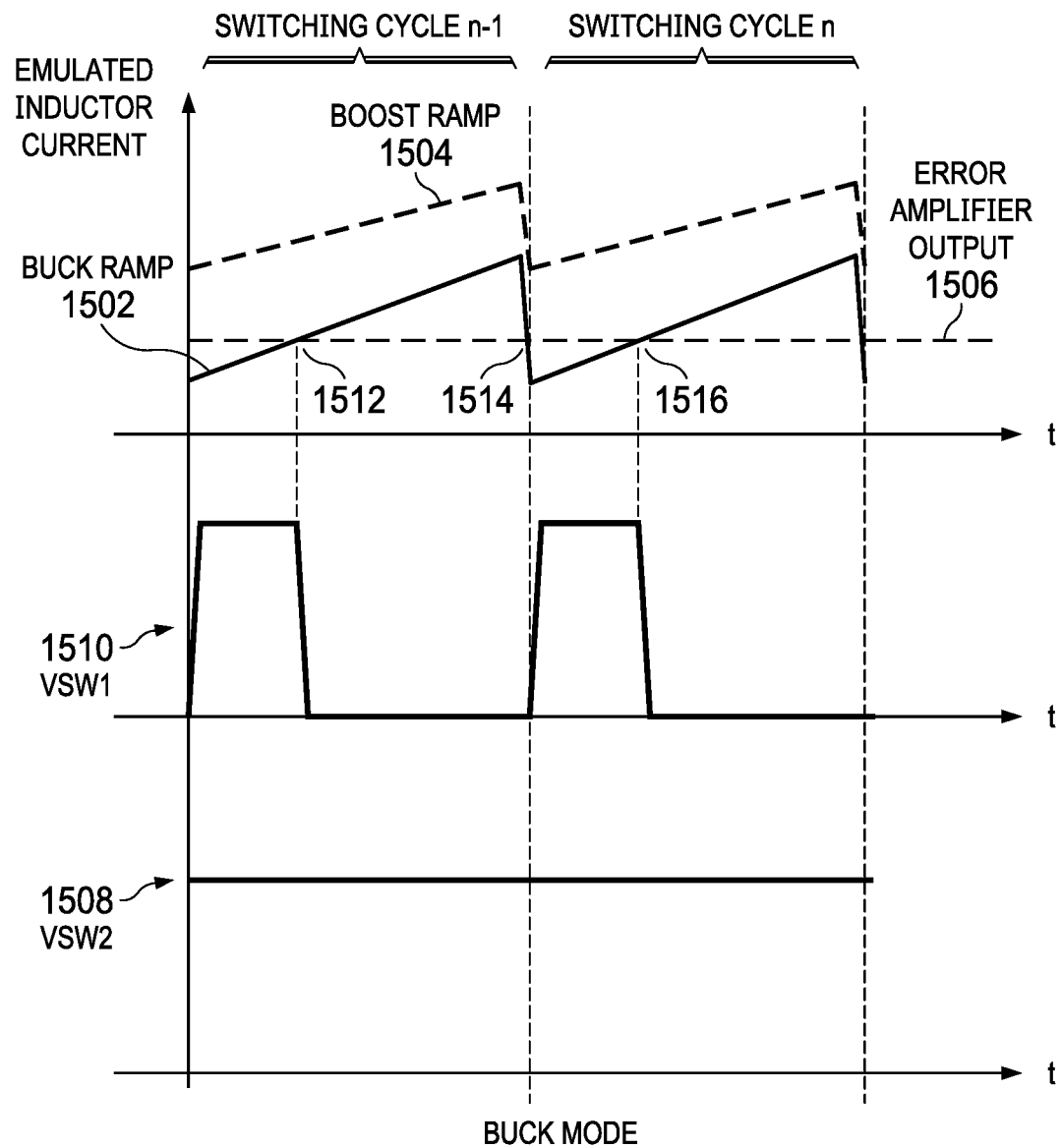
FIG. 15 illustrates buck operation of a converter, according to embodiments of the present disclosure.

FIG. 15 illustrates buck operation of converter 110, according to embodiments of the present disclosure.

Plot 1502 may illustrate a buck ramp, such as buck ramp 402. Plot 1504 may illustrate a boost ramp, such as boost ramp 404. Plot 1506 may illustrate error amplifier output, such as output of amplifier 344. Plot 1510 may illustrate the voltage at a junction SW1 at the midpoint between switches S1 and S2 as illustrated in FIG. 2. The voltage of SW1 (VSW1) may be the voltage on a first side of LSMPS. Plot 1508 may illustrate the voltage at a junction SW2 at the midpoint between switches S3 and S4 as illustrated in FIG. 2. The voltage of SW2 (VSW2) may be the voltage on a second side of LSMPS. VSW1 and VSW2 may represent the state of S1-S4. If VSW1 is high, it corresponds to the case that S1 is on and S2 is off. If VSW2 is high, it corresponds to the case that S5 is on and S3 is off.

In a first switching cycle, buck leg circuit 206 may be on until buck ramp 1502 reaches error amplifier output 1506. Buck leg circuit 206 is on as denoted by a non-zero value of SW1 1510, wherein S1 is on and S2 is off. When buck leg circuit 206 is off, S1 may be off and S2 may be on, and SW1 1510 may have a zero value. Buck ramp 1502 may reach error amplifier output 1506 at time 1612. After time 1612, buck leg circuit 206 may be off.

At the end of the first switching cycle, buck ramp 1502 and boost ramp 1504 may be reset. When buck ramp 1502 crosses the threshold of error amplifier output 1606 in the falling voltage direction, buck leg circuit 206 may be turned back on. In a subsequent switching cycle, at time 1516, buck ramp 1502 may again cross the threshold of error amplifier output 1506 in a rising voltage direction, and buck leg circuit 206 may be turned off again. This operation may repeat for each cycle.

Switch S4 may be continuously on during buck mode, as shown by a constant, non-zero value of SW2 1508, wherein S4 is on and S3 is off. Switch S4 may be continuously on to connect LSMPS right terminal to VOUT.

Figure 16:
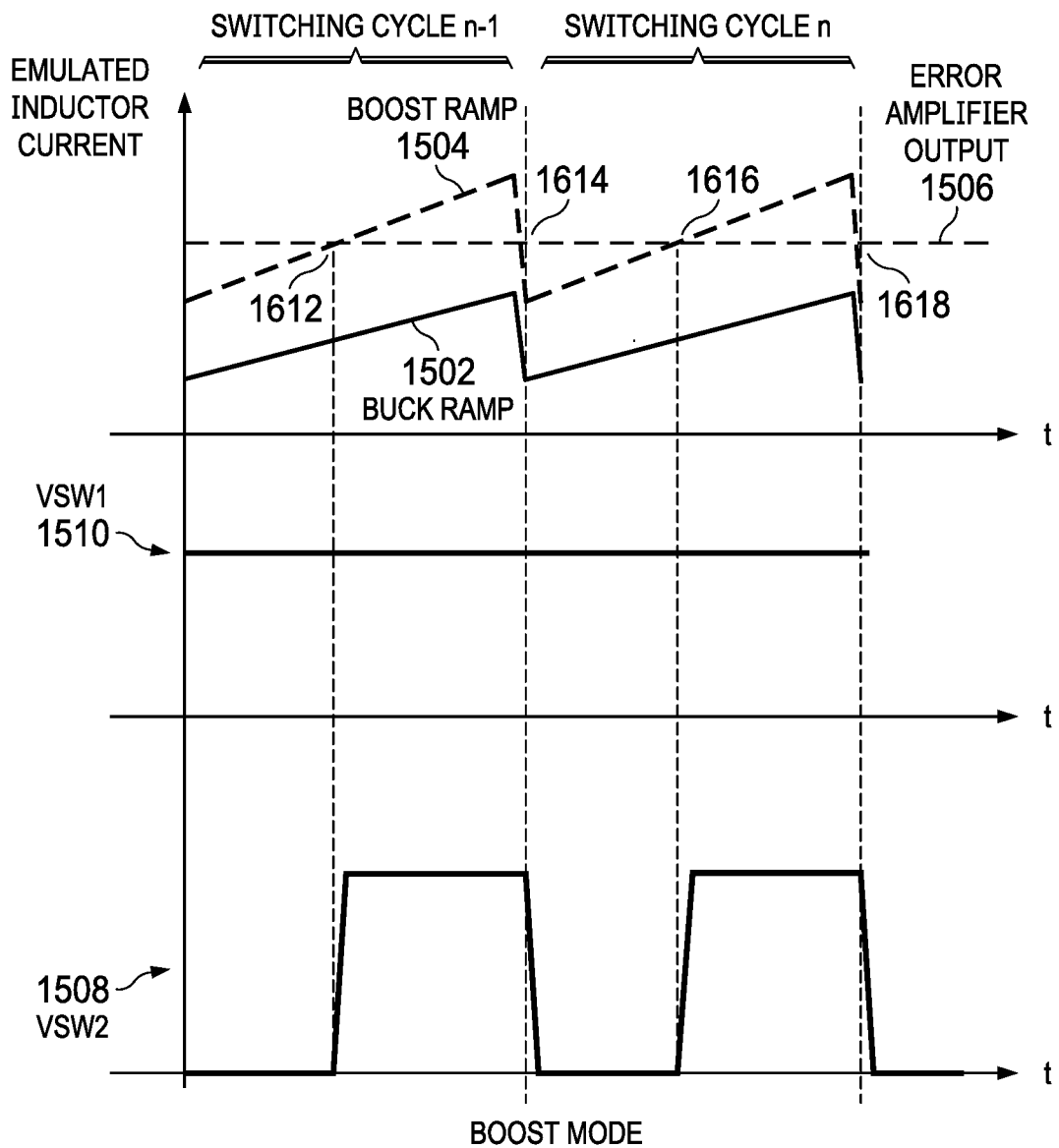
FIG. 16 illustrates boost operation of a converter, according to embodiments of the present disclosure.

FIG. 16 illustrates boost operation of converter 110, according to embodiments of the present disclosure. Plots 1502, 1504, 1506, 1508, 1510 from FIG. 15 may be used in FIG. 16, although with different values for plots 1508, 1510.

In a first switching cycle, boost leg circuit 208 may be off until boost ramp 1504 reaches error amplifier output 1506. Boost leg circuit 208 is off as denoted by a zero value of SW2 1508, wherein S3 is off and S2 is on. When boost leg circuit 208 is on, S4 may be on and S2 may be off, and SW2 1508 may have a positive, non-zero value. Boost ramp 1504 may reach error amplifier output 1506 at time 1612. After time 1612, boost leg circuit 208 may be on.

At the end of the first switching cycle, buck ramp 1502 and boost ramp 1504 may be reset. When boost ramp 1504 crosses the threshold of error amplifier output 1506 in the falling voltage direction, boost leg circuit 208 may be turned back off. In a subsequent switching cycle, at time 1616, boost ramp 1504 may again cross the threshold of error amplifier output 1506 in a rising voltage direction, and boost leg circuit 208 may be turned on again. This operation may repeat for each cycle.

Switch S1 may be continuously on during boost mode, as shown by a constant, non-zero value of SW1 1510, wherein S1 is on and S2 is off. Switch S1 may be continuously on so as to connect a left terminal of LSMPS to VIN.

FIG. 17 illustrates buck-boost operation of converter 110, according to embodiments of the present disclosure. Plots 1502, 1504, 1506, 1508, 1510 from FIG. 15 may be used in FIG. 16, although with different values for plots 1508, 1510.

Initially, buck leg 206 may be on and boost leg 208 may be off. VSW1 1510 may be positive and VSW2 1508 may be zero. At time 1812, boost ramp 1504 may cross the threshold of error amplifier output 1506 in the rising direction. Thus, boost leg circuit 208 may be turned on. VSW2 1508 may be positive. At time 1814, buck ramp 1502 may cross the threshold of error amplifier output 1506 in the rising direction. Thus, buck leg circuit 206 may be turned off. VSW1 1510 may be zero. At time 1716, the switching cycle may end. Boost ramp 1504 and buck ramp 1502 may be reset. As buck ramp 1502 falls and crosses error amplifier output 1506 in the falling direction, buck leg circuit 206 may be turned on and VSW1 1510 may become positive again. As boost ramp 1504 subsequently falls and crosses error amplifier output 1506 in the falling direction, boost leg circuit 206 may be turned off and VSW2 1508 may go back to zero. The operations may repeat in subsequent switching cycles.

The cycle by cycle dynamic adaption of boost ramp pedestal allows precise definition of the transition area between the modes shown above, therefore smooth mode transition can be realized. At the same time, the buck-boost operation area is reduced or minimized, which in general increases the efficiency of the converter.

Although example embodiments have been described above, other variations and embodiments may be made from this disclosure without departing from the spirit and scope of these embodiments.

The invention claimed is:
1. A power converter, comprising:
a buck leg circuit connected between a voltage input of the power converter and ground;
a boost leg circuit connected between a voltage output of the power converter and ground;
an inductor connected between the buck leg circuit and the boost leg circuit;
an error amplifier configured to compare the voltage output of the power converter against a reference voltage to yield a feedback signal; and
a control circuit configured to:

generate a reference buck ramp configured to be compared against the feedback signal to determine whether to operate the buck leg circuit in buck mode; and generate a reference boost ramp by superposing a variable boost ramp portion on to the reference buck ramp, the reference boost ramp configured to be compared against the feedback signal to determine whether to operate the boost leg circuit in boost mode.

2. The power converter of claim 1, further comprising a burst mode circuit configured to send a signal to the control circuit to operate the buck leg circuit or the boost leg circuit in a burst mode based upon a determination that a load connected to the power converter has crossed below a threshold value.

3. The power converter of claim 2, further comprising a clamping circuit configured to modify the feedback signal to at least a minimum value based upon whether the burst mode is to be used.

4. The power converter of claim 3, wherein the clamping circuit is further configured to modify the feedback signal based upon voltage input and voltage output of the power converter.

5. The power converter of claim 1, further comprising a current sensor configured to sense current flowing in the power converter, and wherein the control circuit is further configured to generate the reference buck ramp based upon the current sensed by the current sensor.

6. The power converter of claim 5, wherein the current sensor is configured to sense current in the boost leg circuit.

7. A system, comprising:
a voltage source; and
a power converter configured to receive input from the voltage source at a voltage input of the power converter, the power converter comprising:
  a buck leg circuit connected between the voltage input of the power converter and ground;
  a boost leg circuit connected between a voltage output of the power converter and ground;
  an inductor connected between the buck leg circuit and the boost leg circuit;
  an error amplifier configured to compare the voltage output of the power converter against a reference voltage to yield a feedback signal; and
  a control circuit configured to:
    generate a reference buck ramp configured to be compared against the feedback signal to determine whether to operate the buck leg circuit in buck mode; and
    generate a reference boost ramp by superposing a variable boost ramp portion on to the reference buck ramp, the reference boost ramp configured to be compared against the feedback signal to determine whether to operate the boost leg circuit in boost mode.

8. The system of claim 7, wherein the power converter further comprises a burst mode circuit configured to send a signal to the control circuit to operate the buck leg circuit or the boost leg circuit in a burst mode based upon a determination that a load connected to the power converter has crossed below a threshold value.

9. The system of claim 8, wherein the power converter further comprises a clamping circuit configured to modify the feedback signal to at least a minimum value based upon whether the burst mode is to be used.

10. The system of claim 9, wherein the clamping circuit is further configured to modify the feedback signal based upon voltage input and voltage output of the power converter.

11. The system of claim 7, wherein the power converter further comprises a current sensor configured to sense current flowing in the power converter, and wherein the control circuit is further configured to generate the reference buck ramp based upon the current sensed by the current sensor.

12. The system of claim 11, wherein the current sensor is configured to sense current in the boost leg circuit.

13. A method of converting power, comprising:
receiving input from a voltage source at a voltage input of a power converter;
with a buck leg circuit connected between the voltage input of the power converter and ground, operating the power converter in buck mode;
with a boost leg circuit connected between a voltage output of the power converter and ground, operating the power converter in boost mode;
connecting an inductor between the buck leg circuit and the boost leg circuit;
with an error amplifier, comparing the voltage output of the power converter against a reference voltage to yield a feedback signal; and
with a control circuit:
  generating a reference buck ramp configured to be compared against the feedback signal to determine whether to operate the buck leg circuit in buck mode; and
  generating a reference boost ramp by superposing a variable boost ramp portion on to the reference buck ramp, the reference boost ramp configured to be compared against the feedback signal to determine whether to operate the boost leg circuit in boost mode.

14. The method of claim 13, wherein the power converter further comprises a burst mode circuit configured to send a signal to the control circuit to operate the buck leg circuit or the boost leg circuit in a burst mode based upon a determination that a load connected to the power converter has crossed below a threshold value.

15. The method of claim 14, wherein the power converter further comprises a clamping circuit configured to modify the feedback signal to at least a minimum value based upon whether the burst mode is to be used.

16. The method of claim 15, wherein the clamping circuit is further configured to modify the feedback signal based upon voltage input and voltage output of the power converter.

17. The method of claim 13, wherein the power converter further comprises a current sensor configured to sense current flowing in the power converter, and wherein the control circuit is further configured to generate the reference buck ramp based upon the current sensed by the current sensor.

18. The method of claim 17, wherein the current sensor is configured to sense current in the boost leg circuit.

* * * * *